United States Patent
Kim et al.

(10) Patent No.: US 11,064,365 B2
(45) Date of Patent: Jul. 13, 2021

(54) METHOD FOR SIGNAL TRANSMISSION/RECEPTION BETWEEN BASE STATION AND TERMINAL IN WIRELESS COMMUNICATION SYSTEM SUPPORTING UNLICENSED BAND, AND APPARATUS SUPPORTING SAME

(71) Applicant: LG Electronics Inc., Seoul (KR)

(72) Inventors: Seonwook Kim, Seoul (KR); Joonkui Ahn, Seoul (KR); Suckchel Yang, Seoul (KR); Sukhyon Yoon, Seoul (KR); Changhwan Park, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/486,728

(22) PCT Filed: Feb. 14, 2018

(86) PCT No.: PCT/KR2018/001952
§ 371 (c)(1),
(2) Date: Aug. 16, 2019

(87) PCT Pub. No.: WO2018/151539
PCT Pub. Date: Aug. 23, 2018

(65) Prior Publication Data
US 2019/0387412 A1    Dec. 19, 2019

Related U.S. Application Data

(60) Provisional application No. 62/620,396, filed on Jan. 22, 2018, provisional application No. 62/564,181, (Continued)

(51) Int. Cl.
*H04W 16/14* (2009.01)
*H04J 11/00* (2006.01)
(Continued)

(52) U.S. Cl.
CPC ......... *H04W 16/14* (2013.01); *H04J 11/0073* (2013.01); *H04L 27/2657* (2013.01);
(Continued)

(58) Field of Classification Search
CPC ... H04W 56/001; H04W 16/28; H04W 72/04; H04W 16/14; H04W 56/00; H04W 74/00;
(Continued)

(56) References Cited

U.S. PATENT DOCUMENTS 440,672 A  *  11/1890  Wesson .................. F42B 14/04
                                                    102/511
9,166,718 B2     10/2015  Chen et al.
(Continued)

FOREIGN PATENT DOCUMENTS

| KR | 1020160004626 | 1/2016 |
|---|---|---|
| KR | 1020160093573 | 8/2016 |

(Continued)

OTHER PUBLICATIONS

Huawei et al., "WF on SS burst set composition and SSblock Index Indication," R1-1703832, 3GPP TSG RAN WG1 Meeting #88, Athens, Greece, dated Jan. 13-17, 2017, 7 pages.

(Continued)

*Primary Examiner* — Man U Phan
(74) *Attorney, Agent, or Firm* — Fish & Richardson P.C.

(57) ABSTRACT

Disclosed are a method for signal transmission/reception between a terminal and a base station in a wireless communication system supporting an unlicensed band, and apparatuses supporting the same. Particularly, disclosed are a method for transmitting/receiving a signal and apparatuses supporting the same, wherein a base station transmits a synchronization signal/physical broadcast channel block through an unlicensed band, and a terminal is synchronized (Continued)

with the base station on the basis of the transmitted synchronization signal/physical broadcast channel block.

7 Claims, 21 Drawing Sheets

Related U.S. Application Data filed on Sep. 27, 2017, provisional application No. 62/466,394, filed on Mar. 3, 2017, provisional application No. 62/459,993, filed on Feb. 16, 2017.

(51) Int. Cl.
*H04L 27/26* (2006.01)
*H04W 56/00* (2009.01)
*H04W 72/12* (2009.01)
*H04W 74/08* (2009.01)

(52) U.S. Cl.
CPC ....... *H04L 27/2673* (2013.01); *H04W 56/001* (2013.01); *H04W 72/1215* (2013.01); *H04W 74/0816* (2013.01)

(58) Field of Classification Search
CPC ......... H04W 72/1215; H04W 74/0816; H04W 74/08; H04W 74/12; H04W 72/12; H04L 27/2657; H04L 27/2673; H04L 27/26; H04J 11/0073; H04J 11/00
USPC ........................................................ 370/329
See application file for complete search history.

(56) References Cited

U.S. PATENT DOCUMENTS

| | | | | |
|---|---|---|---|---|
| 9,713,035 | B2* | 7/2017 | Bhushan | H04W 56/002 |
| 10,506,588 | B2* | 12/2019 | Kim | H04L 5/0053 |
| 10,674,463 | B2* | 6/2020 | Ko | H04W 72/04 |
| 10,757,666 | B2* | 8/2020 | Ko | H04J 11/00 |
| 10,791,550 | B2* | 9/2020 | Ko | H04W 48/12 |
| 2014/0341018 | A1 | 11/2014 | Bhushan et al. | |
| 2018/0167195 | A1* | 6/2018 | Ly | H04L 27/2613 |
| 2018/0242324 | A1* | 8/2018 | Luo | H04L 5/005 |
| 2019/0387441 | A1* | 12/2019 | Koskela | H04W 36/30 |
| 2020/0037297 | A1* | 1/2020 | Pan | H04W 16/28 |
| 2020/0053670 | A1* | 2/2020 | Jung | H04W 56/0015 |
| 2020/0221404 | A1* | 7/2020 | Takeda | H04W 72/042 |
| 2020/0280940 | A1* | 9/2020 | Kim | H04W 76/28 |

FOREIGN PATENT DOCUMENTS

| | | |
|---|---|---|
| KR | 1020160137153 | 11/2016 |
| WO | 2013010014 | 1/2013 |
| WO | WO2016182046 | 11/2016 |

OTHER PUBLICATIONS

Qualcomm Incorporated, "PBCH design considerations," R1-1702589, 3GPP TSG-RAN WG1 #88, Athens, Greece, dated Feb. 7, 2017, 9 pages.
PCT International Search Report and Written Opinion in International Application No. PCT/KR2018/001952, dated Jun. 14, 2018, 25 pages (with English translation).
Extended European Search Report in European Application No. 18755044.7, dated Nov. 19, 2020, 11 pages.
Panasonic, "NR synchronization signal and DL broadcast signal," R1-1612229, 3GPP TSG RAN WG1 Meeting #87, Reno, USA, dated Nov. 14-18, 2016, 3 pages.
Ericsson, "SS Burst Set Composition," R1-1706008, 3GPP TSG-RAN WG1 Meeting #88bis, Spokane, U.S., dated Apr. 3-7, 2017, 6 pages.
Japanese Office Action in Japanese Application No. 2019-544607, dated Sep. 15, 2020, 5 pages.

* cited by examiner (a)

(b)

(a)

(b)

(a)

(b)

(c)

(d)

(a)

(b)

(c)

(d)

(a)

(b)

(c)

(d)

METHOD FOR SIGNAL TRANSMISSION/RECEPTION BETWEEN BASE STATION AND TERMINAL IN WIRELESS COMMUNICATION SYSTEM SUPPORTING UNLICENSED BAND, AND APPARATUS SUPPORTING SAME

CROSS-REFERENCE TO RELATED APPLICATIONS

This application is a National Stage application under 35 U.S.C. § 371 of International Application No. PCT/KR2018/001952, filed on Feb. 14, 2018, which claims the benefit of U.S. Provisional Application No. 62/620,396, filed on Jan. 22, 2018, U.S. Provisional Application No. 62/564,181, filed on Sep. 27, 2017, U.S. Provisional Application No. 62/466,394, filed on Mar. 3, 2017, and U.S. Provisional Application No. 62/459,993, filed on Feb. 16, 2017. The disclosures of the prior applications are incorporated by reference in their entirety.

TECHNICAL FIELD

The following description relates to a wireless communication system, and more particularly, to a method for transmitting and receiving signals between a terminal and a base station in a wireless communication system supporting an unlicensed band, and apparatuses supporting the same.

In particular, the following description includes description of a method for signal transmission/reception for establishing synchronization with a base station by a terminal based on a synchronization signal block when the base station transmits the synchronization signal block in an unlicensed band, and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

An object of the present invention is to provide a method for transmitting and receiving a signal between a terminal and a base station in an unlicensed band when the unlicensed band is supported by a newly proposed wireless communication system, and apparatuses therefor.

In particular, it is an object of the invention to provide a method for signal transmission/reception for establishing synchronization with a base station by a terminal based on a synchronization signal block when the base station transmits the synchronization signal block in an unlicensed band, and apparatuses supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method and apparatuses for transmitting/receiving signals between a base station and a terminal in a wireless communication system supporting an unlicensed band.

In one aspect of the present invention, provided herein is a method for transmitting and receiving, by a base station, signals to and from a terminal in a wireless communication system supporting an unlicensed band, the method including performing a channel access procedure for signal transmission through the unlicensed band, and after succeeding in the channel access procedure, transmitting, to the terminal, a synchronization signal (SS)/physical broadcast channel (PBCH) block and information about a resource on which the SS/PBCH block is transmitted, through the unlicensed band.

In another aspect of the present invention, provided herein is a base station for transmitting and receiving signals to and from a terminal in a wireless communication system supporting an unlicensed band, the base station including a transmitter, a receiver, and a processor operatively coupled to the transmitter and the receiver, wherein the processor is configured to perform a channel access procedure for signal transmission through the unlicensed band, and after succeeding in the channel access procedure, transmit, to the terminal, a synchronization signal (SS)/physical broadcast channel (PBCH) block and resource information through which the SS/PBCH block is transmitted, through the unlicensed band.

Herein, the information about the resource may include at least one of beam information through which the SS/PBCH block is transmitted, slot index information through which the SS/PBCH block is transmitted, and symbol index information through which the SS/PBCH block is transmitted.

In this case, the information about the resource may be indicated through sequence information applied to the SS/PBCH block or broadcast information in the SS/PBCH block.

Further, the SS/PBCH block may include a primary synchronization signal (PSS), a secondary synchronization signal (SSS), and a physical broadcast channel (PBCH).

The base station may receive a signal corresponding to the SS/PBCH block from the terminal through the unlicensed band.

Herein, the signal corresponding to the SS/PBCH block may be transmitted based on a radio frame boundary and a slot boundary of the unlicensed band determined by the information about the resource.

In another aspect of the present invention, provided herein is a method for transmitting and receiving, by a terminal, signals to and from a base station in a wireless communication system supporting an unlicensed band, the method including receiving one or more synchronization signal (SS)/physical broadcast channel (PBCH) blocks and information about a resource on which each of the SS/PBCH blocks is transmitted from the base station through the unlicensed band, combining and decoding SS/PBCH blocks transmitted over the same beam among the one or more SS/PBCH blocks, determining a radio frame boundary of the unlicensed band and a slot boundary of the unlicensed band based on the information about the resource through which the SS/PBCH blocks transmitted over the same beam are transmitted, and transmitting a signal corresponding to the SS/PBCH blocks transmitted over the same beam based on the determined radio frame boundary and slot boundary of the unlicensed band.

In another aspect of the present invention, provided herein is a terminal for transmitting and receiving signals to and from a base station in a wireless communication system supporting an unlicensed band, the terminal including a transmitter, a receiver, and a processor operatively coupled to the transmitter and the receiver, wherein the processor is configured to receive one or more synchronization signal (SS)/physical broadcast channel (PBCH) blocks and information about a resource through which each of the SS/PBCH blocks is transmitted from the base station through the unlicensed band, combine and decode SS/PBCH blocks transmitted over the same beam among the one or more SS/PBCH blocks, determine a radio frame boundary of the unlicensed band and a slot boundary of the unlicensed band based on information the resource through which the SS/PBCH blocks transmitted over the same beam are transmitted, and transmit a signal corresponding to the SS/PBCH blocks transmitted over the same beam based on the determined radio frame boundary and slot boundary of the unlicensed band.

Herein, the information about the resource through which each of the SS/PBCH blocks is transmitted may include at least one of beam information through which each of the SS/PBCH blocks is transmitted, slot index information through which each of the SS/PBCH blocks is transmitted, and symbol index information through which each of the SS/PBCH blocks is transmitted.

In particular, the information about the resource through which each of the SS/PBCH blocks is transmitted may be indicated through sequence information applied to each of the SS/PBCH blocks, or broadcast information in each of the SS/PBCH blocks.

Further, each of the SS/PBCH blocks may include a primary synchronization signal (PSS), a secondary synchronization signal (SSS), and a physical broadcast channel (PBCH).

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present invention have the following effects.

According to the present invention, a terminal and a base station are allowed to transmit/receive a signal from the time when a channel access procedure for an unlicensed band is successful, and resource information (e.g., a slot index and a symbol index) may be transmitted along with the signal.

For example, when the base station transmits an SS/PBCH block to the terminal through one or more beams in an unlicensed band, the terminal may establish synchronization with the base station using the information about the resources on which the SS/PBCH block has been actually transmitted.

It will be appreciated by persons skilled in the art that that the effects that can be achieved through the embodiments of the present invention are not limited to those described above and other advantageous effects of the present invention will be more clearly understood from the following detailed description. That is, unintended effects according to implementation of the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Figure 1:
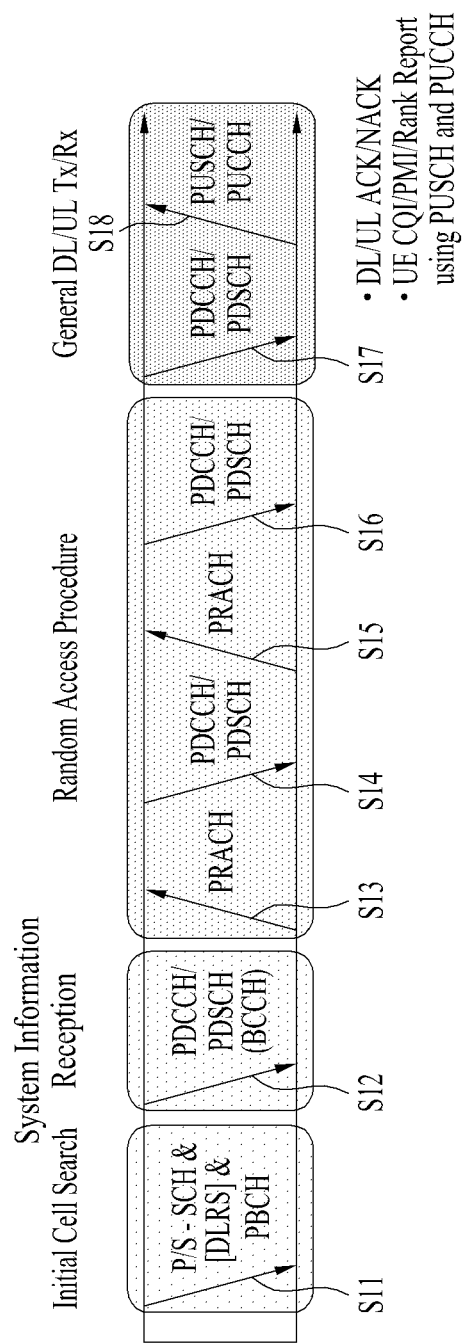
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission/Reception Method Using the Same In a wireless access system, a UE receives information from an base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an base station. Specifically, the UE synchronizes its timing to the base station and acquires information such as a cell Identifier (ID) by receiving a Primary Synchronization Channel (P-SCH) and a Secondary Synchronization Channel (S-SCH) from the base station.

Then the UE may acquire information broadcast in the cell by receiving a Physical Broadcast Channel (PBCH) from the base station.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the base station, the UE may perform a random access procedure with the base station (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the base station (S17) and transmit a Physical Uplink Shared Channel (PUSCH) and/or a Physical Uplink Control Channel (PUCCH) to the base station (S18), in a general UL/DL signal transmission procedure.

Control information that the UE transmits to the base station is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
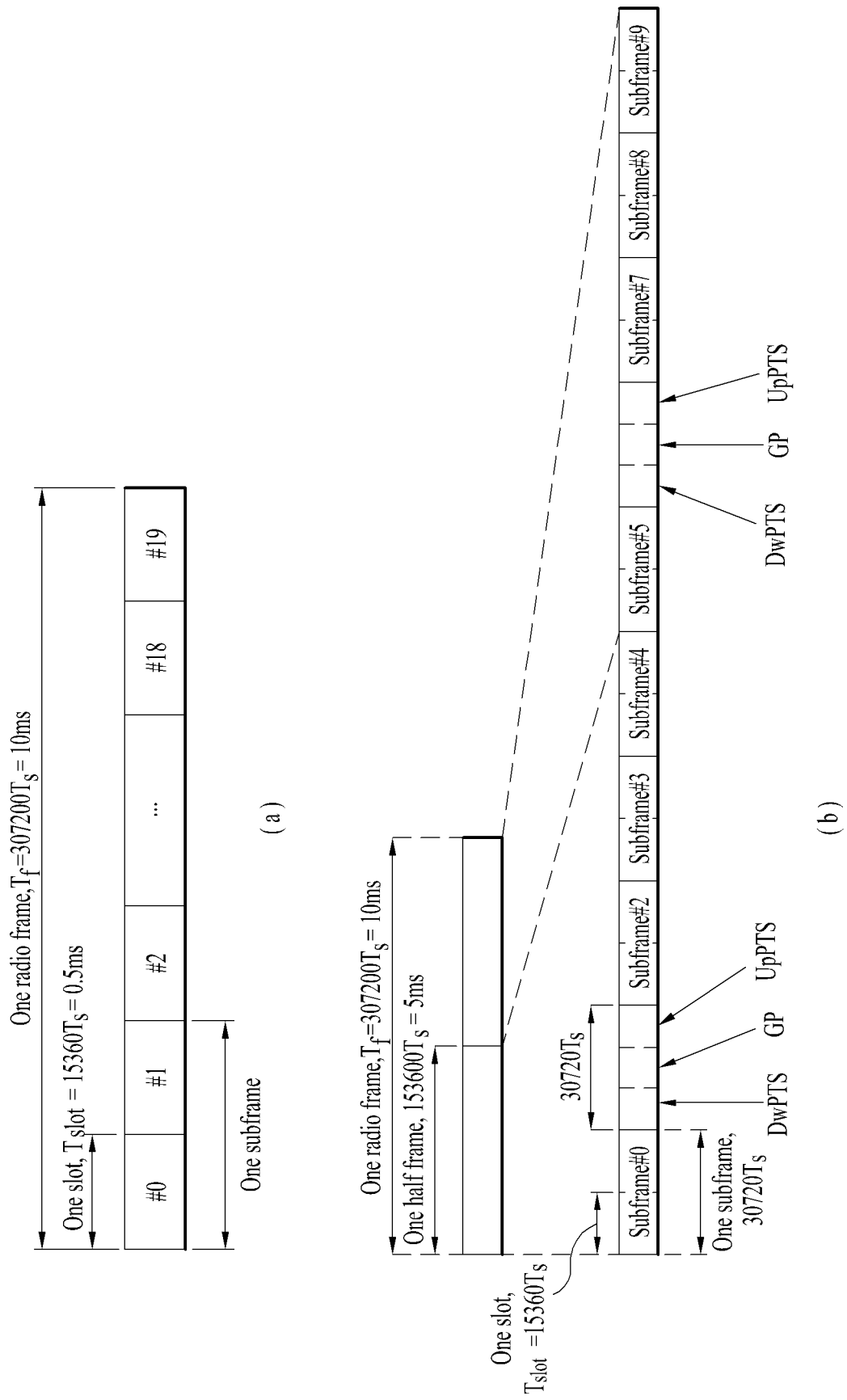
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an base station. The GP is used to cancel UL interference between a UL and a DL, caused by the multi-path delay of a DL signal.

Table 1 below lists special subframe configurations (DwPTS/GP/UpPTS lengths).

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | | |
| 8 | $24144 \cdot T_s$ | | | — | — | — |

Figure 3:
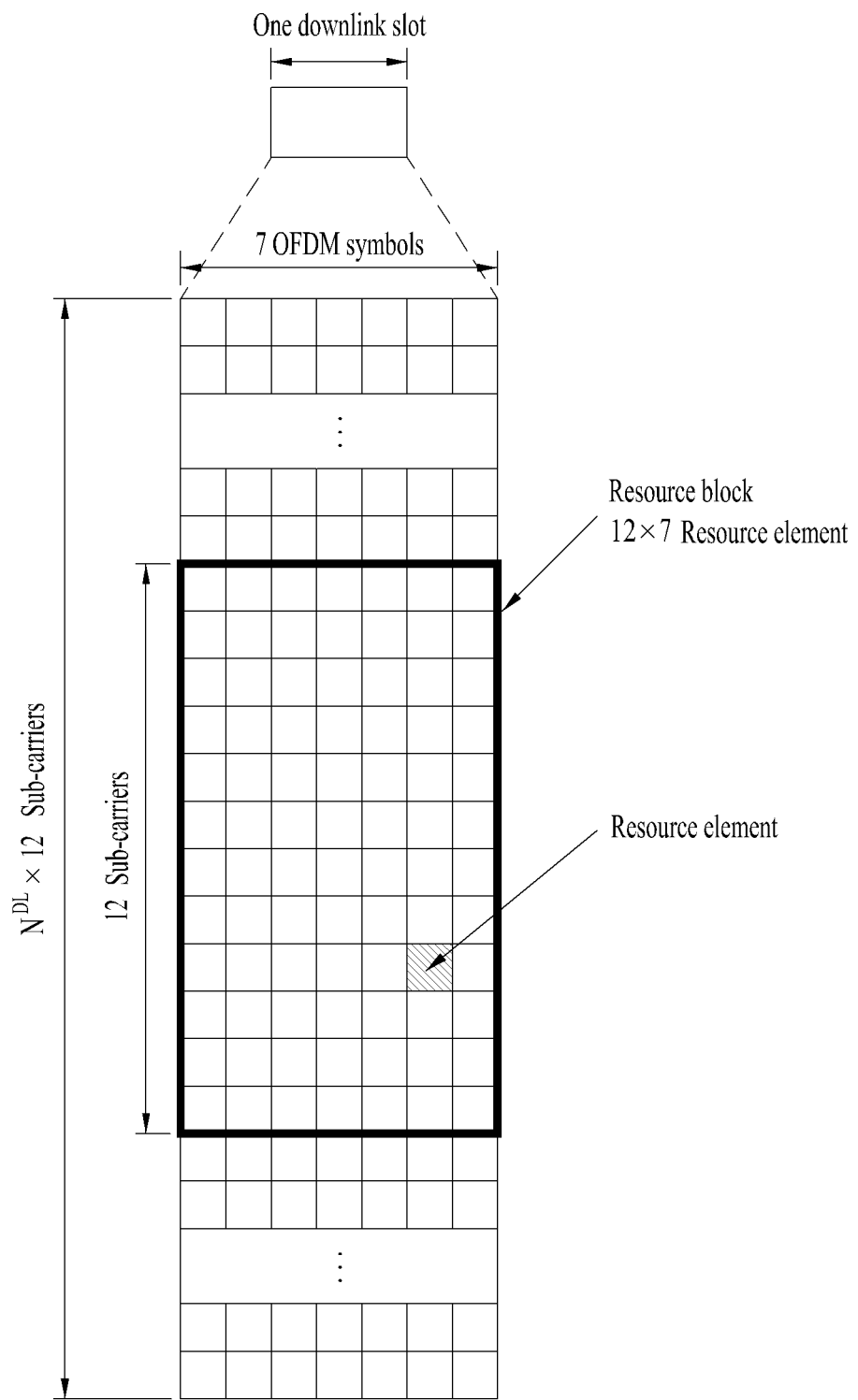
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
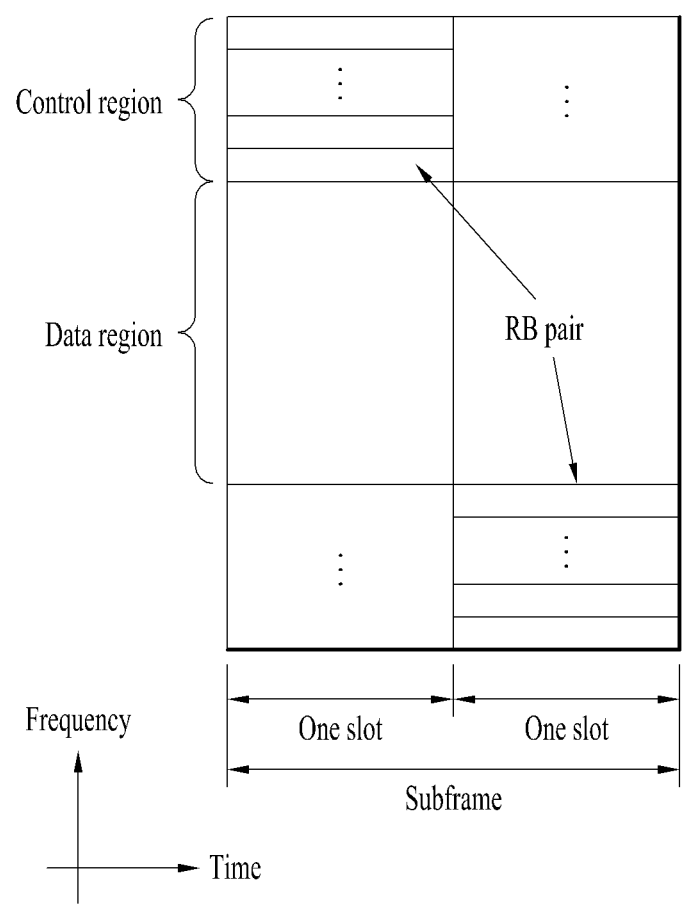
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
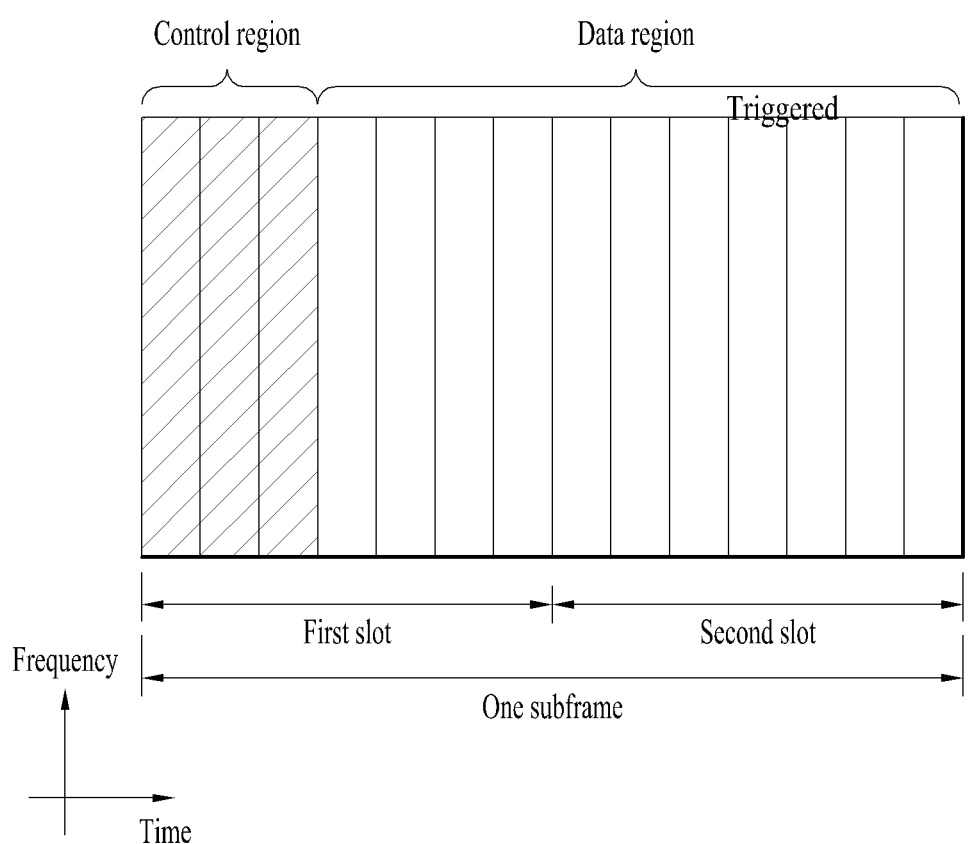
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

LTE systems support radio resource management (RRM) operations including power control, scheduling, cell search, cell reselection, handover, radio link or connection monitoring, and connection establishment/re-establishment. In this operation, a serving cell may make a request to a UE for RRM measurement information, which is a measurement value for performing the RRM operation. As typical information, in an LTE system, a UE may measure information such as cell search information on each cell, reference signal received power (RSRP), and reference signal received quality (RSRQ) and report the same as typical information. Specifically, in the LTE system, the UE may receive 'measConfig' from the serving cell over a higher-layer signal for RRM measurement, and measure the RSRP or RSRQ according to the information of 'measConfig'.

Here, RSRP, RSRQ, and RSSI defined in the LTE system may be defined as follows.

Reference signal received power (RSRP), is defined as the linear average over the power contributions (in [W]) of the resource elements that carry cell-specific reference signals within the considered measurement frequency bandwidth. For example, for RSRP determination, the cell-specific reference signals $R_0$ shall be used. If the UE can reliably detect that $R_1$ is available it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI) comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise, etc. If higher-layer signalling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

Next, Received Signal Strength Indicator (RSSI) is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

In accordance with the definitions above, in the case of intra-frequency measurement, a UE operating in the LTE system may measure RSRP in the bandwidth indicated through the allowed measurement bandwidth-related information element (IE), which is transmitted on system information block type 3, in SIB3. Alternatively, in the case of inter-frequency measurement, the UE may measure RSRP in a bandwidth corresponding to one of 6, 15, 25, 50, 75, and 100 resource blocks (RBs) indicated through the allowed measurement bandwidth transmitted in SIB5. Alternatively, in the case where the IE is absent, the UE may measure RSRP in the frequency band of the entire downlink (DL) system as a default operation.

In this case, if the UE receives the information on the allowed measurement bandwidth, the UE may consider the corresponding value as the maximum measurement bandwidth and freely measure the RSRP value within the range of the corresponding value. However, if the serving cell transmits an IE defined as WB-RSRQ to the UE and the allowed measurement bandwidth is set to 50 RBs or more, the UE shall calculate the RSRP value for the entire allowed measurement bandwidth. In the RSSI measurement, the UE measures RSSI using the frequency band of the receiver of the UE according to the definition of the RSSI bandwidth.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
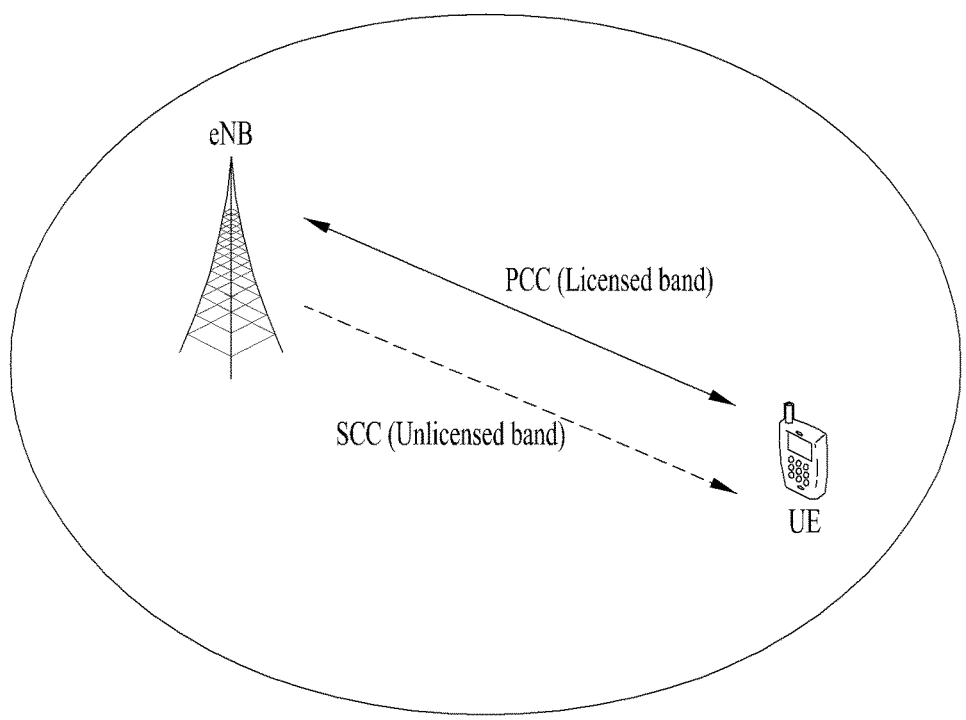
FIG. 6 is a diagram illustrating an exemplary carrier aggregation (CA) environment supported in a long term evolution-unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one base station supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of base stations.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the base station may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the base station may configure a TxOP including N consecutive subframes. In this case, a value of N and a use of the N subframes may previously be notified from the base station to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an base station may start signal transmission in the SCell. This procedure may be referred to as LBT.

Figure 7:
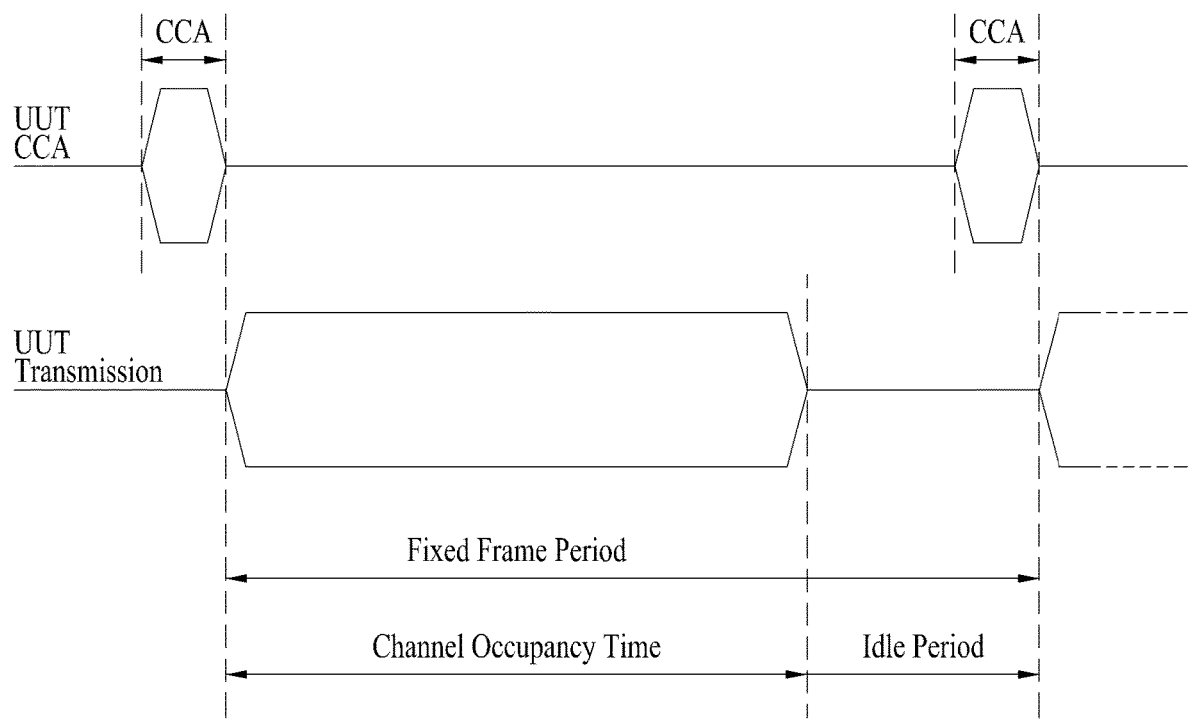
FIG. 7 is a diagram illustrating an exemplary frame based equipment (FBE) operation as one of listen-before-talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 µs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
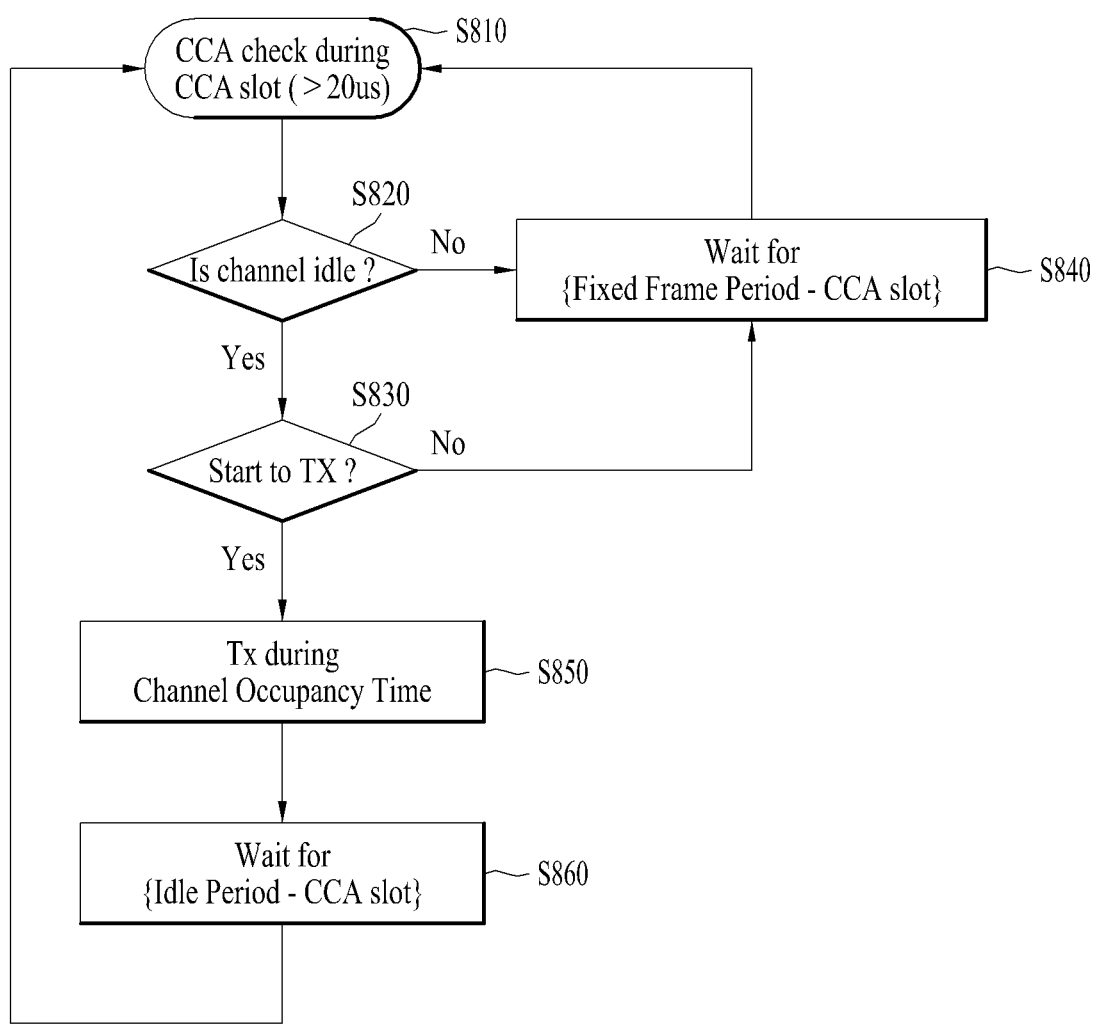
FIG. 8 is a block diagram illustrating the FBE operation.

FIG. 8 is a block diagram illustrating the FBE operation.

Referring to FIG. 8, a communication node (i.e., base station) managing an SCell performs CCA during a CCA slot [S810]. If the channel is idle [S820], the communication node performs data transmission (Tx) [S830]. If the channel is busy, the communication node waits for a time period calculated by subtracting the CCA slot from a fixed frame period, and then resumes CCA [S840].

The communication node transmits data during the channel occupancy time [S850]. Upon completion of the data transmission, the communication node waits for a time period calculated by subtracting the CCA slot from the idle period [S860], and then resumes CCA [S810]. If the channel is idle but the communication node has no transmission data, the communication node waits for the time period calculated by subtracting the CCA slot from the fixed frame period [S840], and then resumes CCA [S810].

Figure 9:
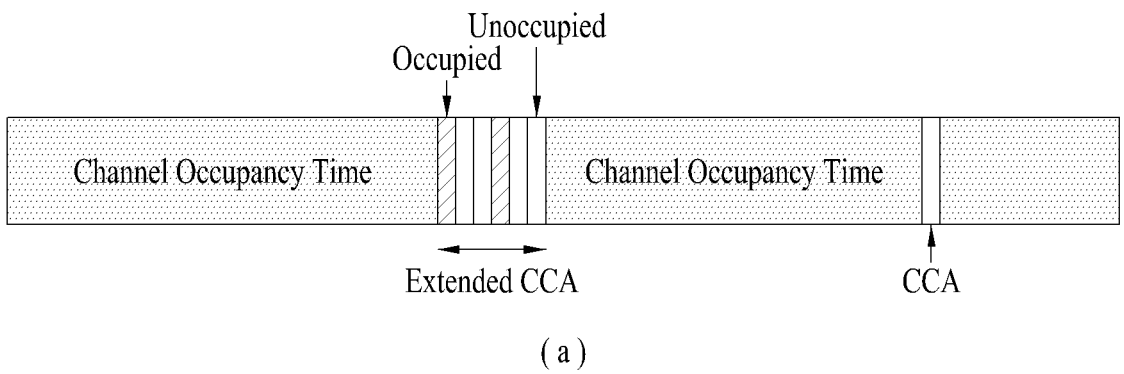
FIG. 9 is a diagram illustrating an exemplary load based equipment (LBE) operation as one of the LBT operations.
Figure 9:
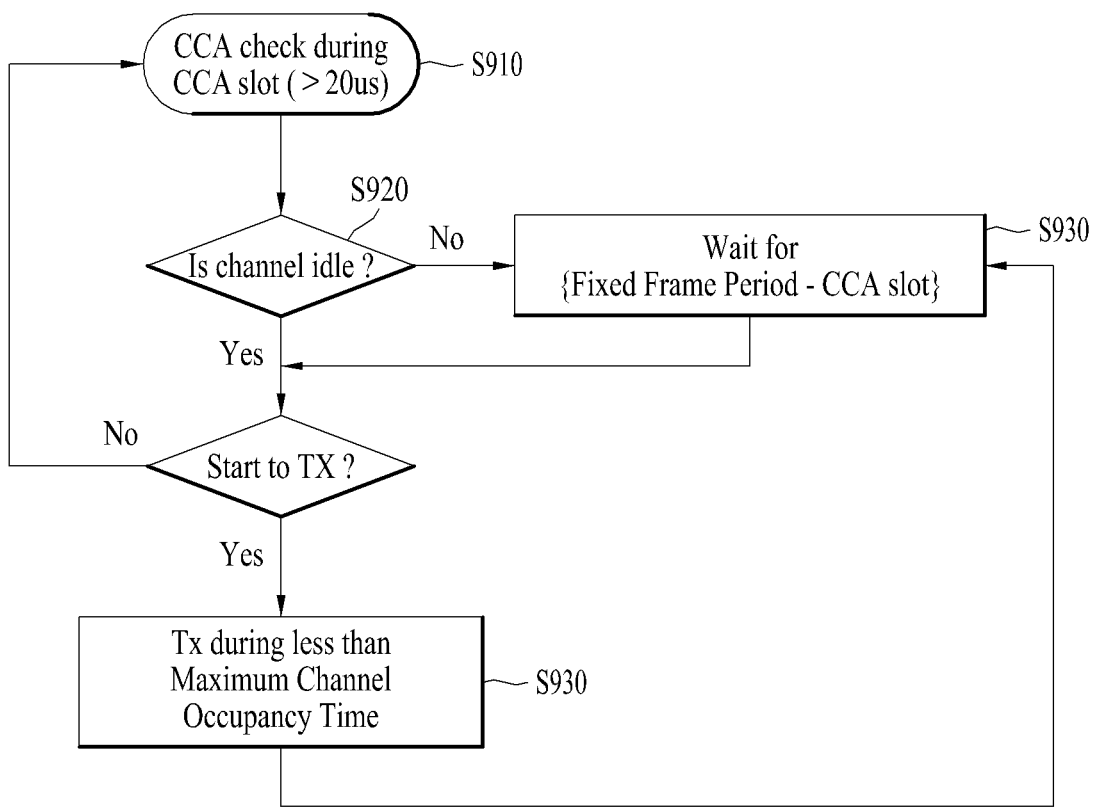

FIG. 9 is a view illustrating an exemplary LBE operation as one of the LBT operations.

Referring to FIG. 9(a), in LBE, the communication node first sets q (q ∈ {4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot [S910]. If the channel is unoccupied in a first CCA slot [S920], the communication node may transmit data by securing a time period of up to $(13/32)q$ ms [S930].

On the contrary, if the channel is occupied in the first CCA slot, the communication node selects N (N ∈ {1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to $(13/32)q$ ms [S940].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
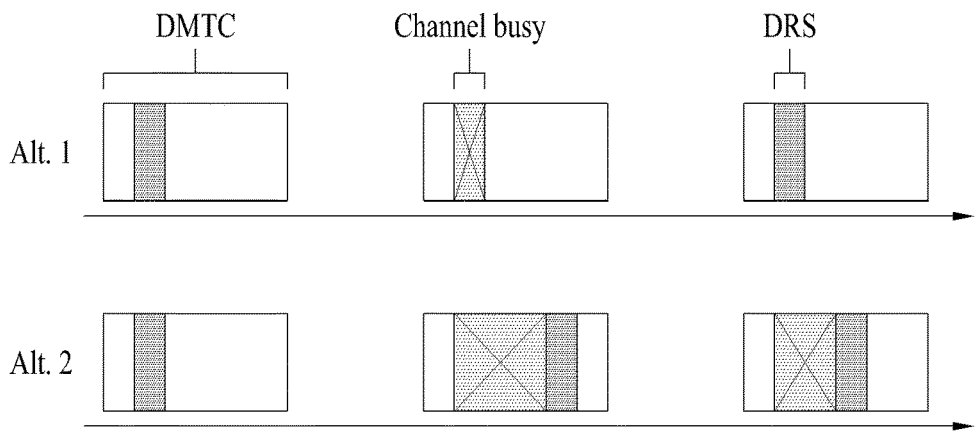
FIG. 10 is a diagram illustrating methods of transmitting a discovery reference signal (DRS) supported in a licensed assisted access (LAA) system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
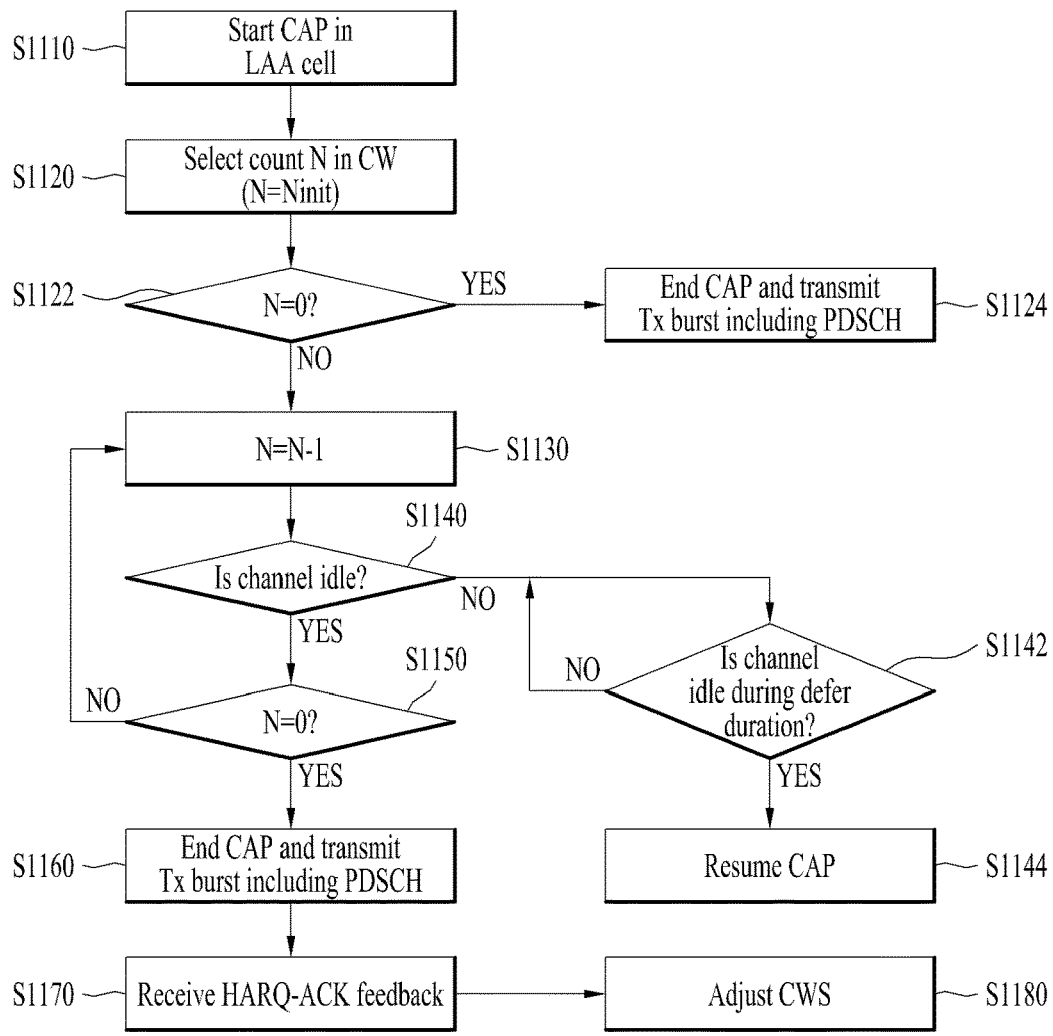
FIG. 11 is a diagram illustrating a channel access procedure (CAP) and contention window adjustment (CWA)

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

2.6. Channel Access Priory Class

TABLE 2

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an base station transmits a downlink signal via an unlicensed band, the base station performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

2.7. Subframe Structure Applicable to LAA System

Figure 12:
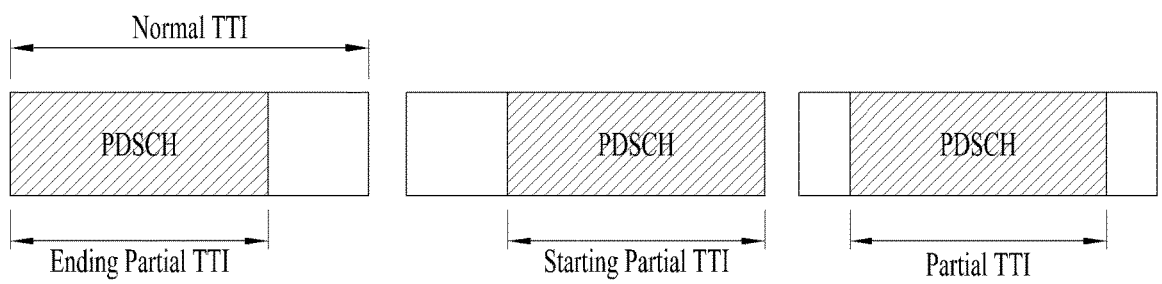
FIG. 12 is a diagram illustrating a partial transmission time interval (TTI) or a partial subframe, which is applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

3. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

3.1. Numerologies

The NR system to which the present invention is applicable supports various OFDM numerologies shown in the following table. In this case, the value of p and cyclic prefix information per carrier bandwidth part can be signaled in DL and UL, respectively. For example, the value of p and cyclic prefix information per downlink carrier bandwidth part may be signaled though DL-BWP-mu and DL-MWP-cp corresponding to higher layer signaling. As another example, the value of p and cyclic prefix information per uplink carrier bandwidth part may be signaled though UL-BWP-mu and UL-MWP-cp corresponding to higher layer signaling.

TABLE 3

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

3.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu} - 1\}$ and may also be numbered within a frame in ascending order like $n_{s,f}^\mu \in \{0, \ldots, N_{slot}^{frame,\mu} - 1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure can be applied based on the above-described slot structure.

Figure 13:
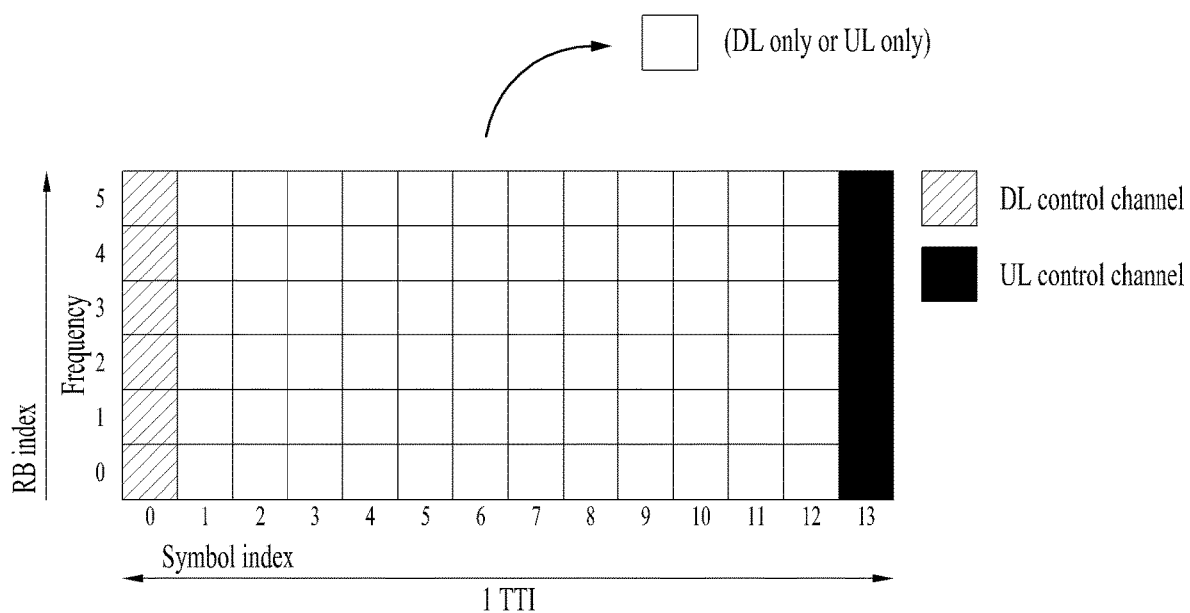
FIG. 13 is a diagram illustrating a self-contained subframe structure applicable to the present invention.

FIG. 13 is a diagram illustrating a self-contained slot structure applicable to the present invention.

In FIG. 13, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the base station and UE can sequentially perform DL transmission and UL transmission in one slot. That is, the base station and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the base station and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 13.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

3.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 14:
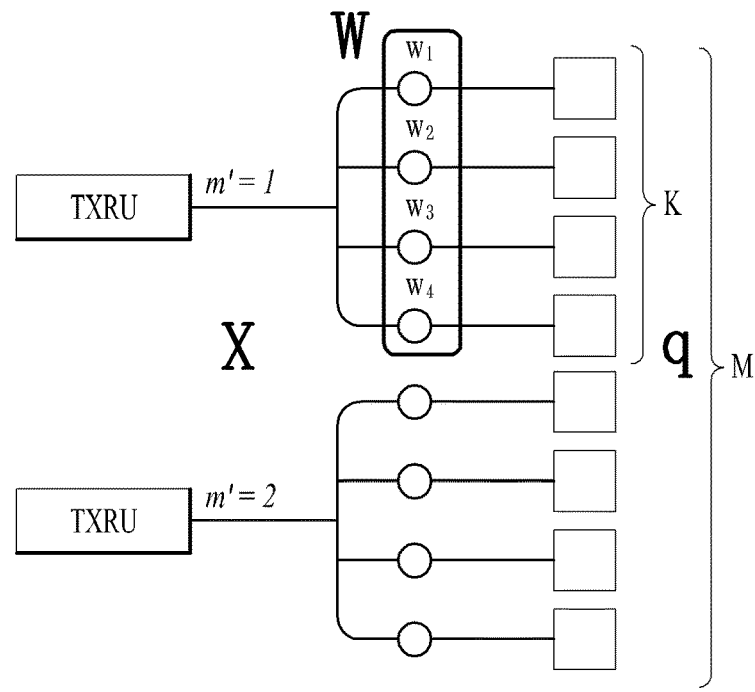
FIGS. 14 and 15 are diagrams illustrating representative methods for connecting TXRUs to antenna elements.
Figure 15:
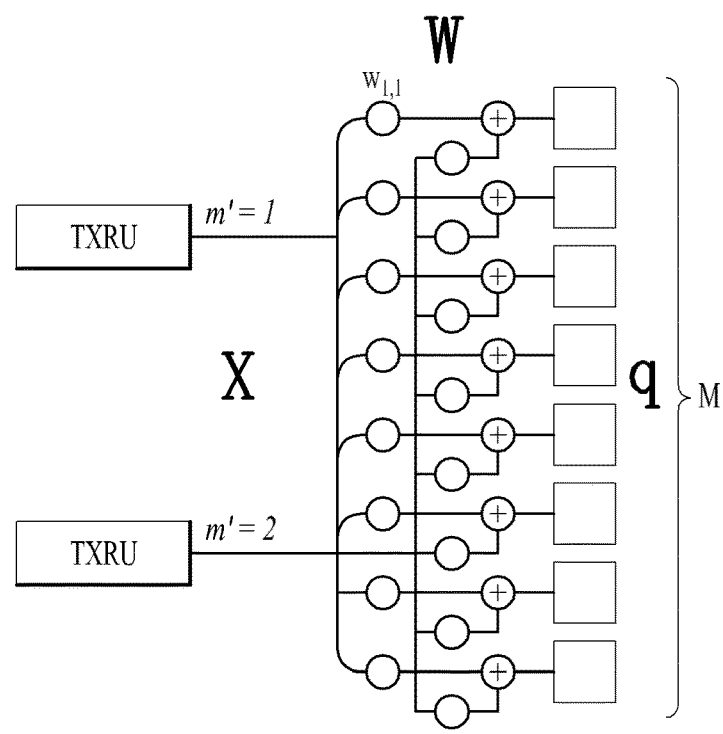

FIGS. 14 and 15 are diagrams illustrating representative methods for connecting TXRUs to antenna elements. Here, the TXRU virtualization model represents the relationship between TXRU output signals and antenna element output signals.

FIG. 14 shows a method for connecting TXRUs to sub-arrays. In FIG. 14, one antenna element is connected to one TXRU.

Meanwhile, FIG. 15 shows a method for connecting all TXRUs to all antenna elements. In FIG. 15, all antenna element are connected to all TXRUs. In this case, separate addition units are required to connect all antenna elements to all TXRUs as shown in FIG. 15.

In FIGS. 14 and 15, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 14 has a disadvantage in that it is difficult to achieve beamforming focusing but has an advantage in that all antennas can be configured at low cost.

On the contrary, the configuration shown in FIG. 15 is advantageous in that beamforming focusing can be easily achieved. However, since all antenna elements are connected to the TXRU, it has a disadvantage of high cost.

When a plurality of antennas is used in the NR system to which the present invention is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 16:
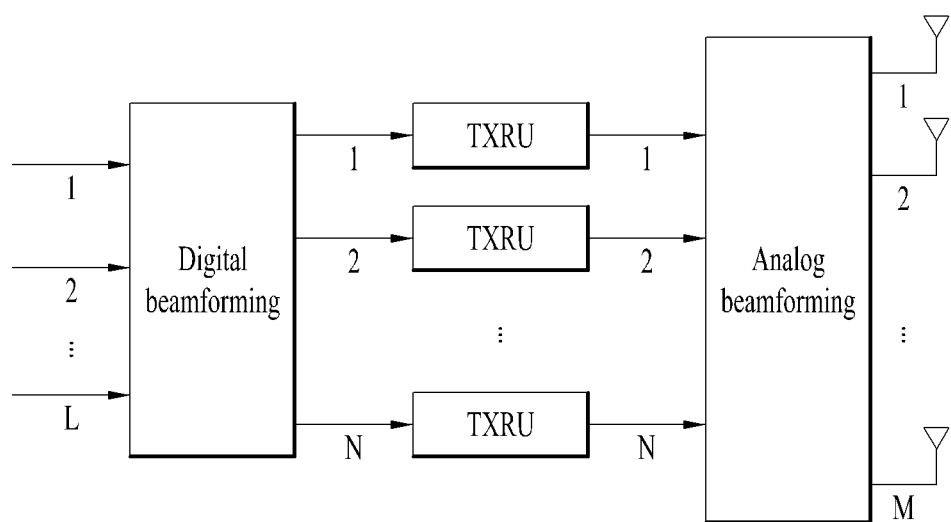
FIG. 16 is a diagram schematically illustrating a hybrid beamforming structure in terms of TXRU and physical antennas according to an embodiment of the present invention.

FIG. 16 is a diagram schematically illustrating an exemplary hybrid BF structure from the perspective of TXRUs and physical antennas according to the present invention. In FIG. 16, the number of digital beams is L and the number analog beams is N.

Additionally, in the NR system to which the present invention is applicable, an base station designs analog BF to be changed in units of symbols to provide more efficient BF support to a UE located in a specific area. Furthermore, as illustrated in FIG. 16, when N specific TXRUs and M RF antennas are defined as one antenna panel, the NR system according to the present invention considers introducing a plurality of antenna panels to which independent hybrid BF is applicable.

In the case in which the base station utilizes a plurality of analog beams as described above, the analog beams advantageous for signal reception may differ according to a UE. Therefore, in the NR system to which the present invention is applicable, a beam sweeping operation is being considered in which the base station transmits signals (at least synchronization signals, system information, paging, and the like) by applying different analog beams in a specific subframe (SF) on a symbol-by-symbol basis so that all UEs may have reception opportunities.

Figure 17:
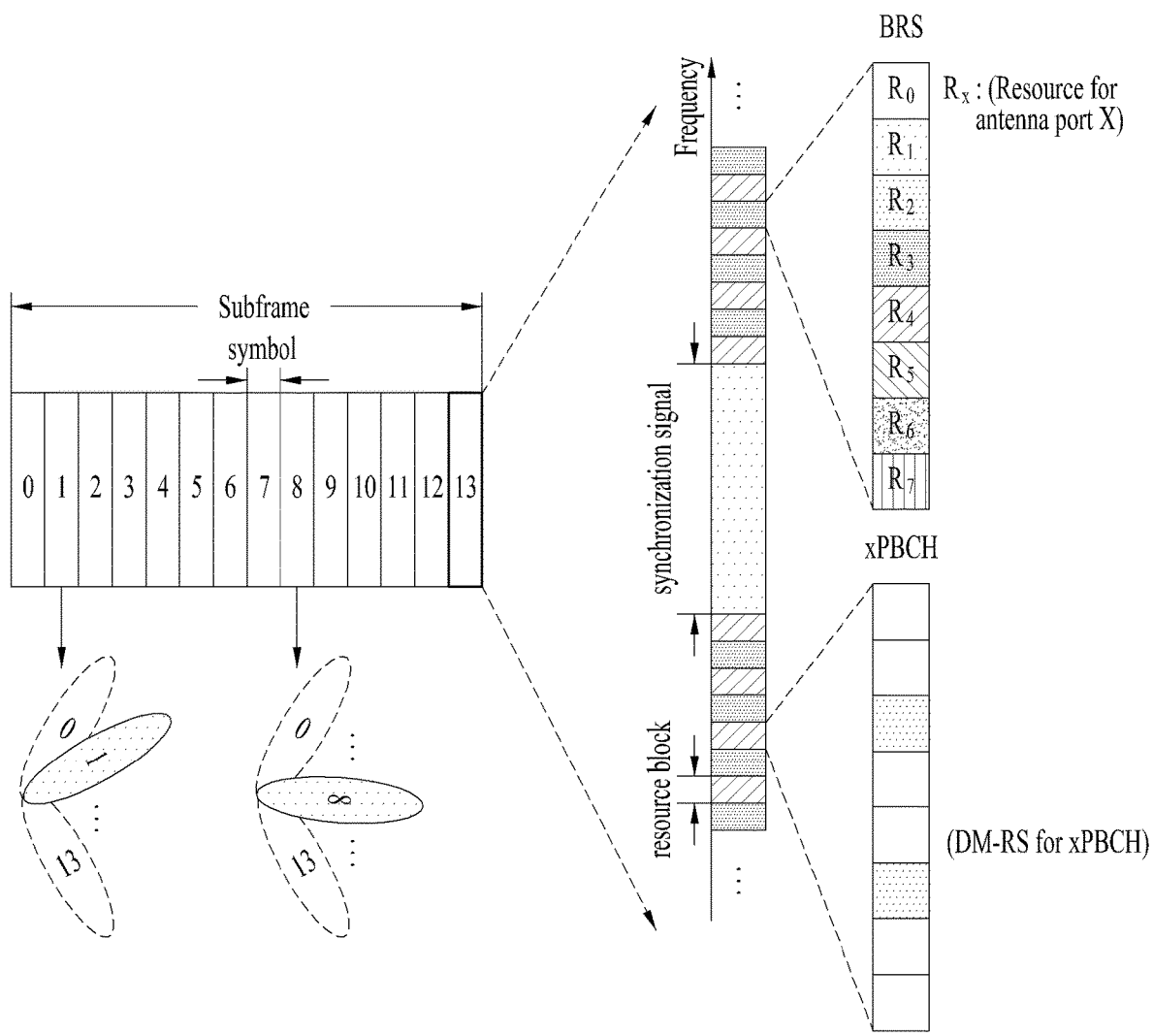
FIG. 17 is a diagram schematically illustrating a beam sweeping operation for a synchronization signal and system information in a downlink (DL) transmission operation according to an embodiment of the present invention.

FIG. 17 is a diagram schematically illustrating an exemplary beam sweeping operation for a synchronization signal and system information in a DL transmission procedure according to the present invention.

In FIG. 17 below, a physical resource (or physical channel) on which the system information of the NR system to which the present invention is applicable is transmitted in a broadcasting manner is referred to as an xPBCH. Here, analog beams belonging to different antenna panels within one symbol may be simultaneously transmitted.

As illustrated in FIG. 17, in order to measure a channel for each analog beam in the NR system to which the present invention is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

4. Proposed Embodiments

Hereinafter, the operation of a UE and a base station in the unlicensed band based on the above technical configuration will be described in detail.

4.1. Method for Adjusting Blind Detection (BD) Candidates

In the Rel-14 eLAA system to which the present invention is applicable, DCI formats 0A/0B/4A/4B are newly defined. Here, DCI formats 0A/4A are downlink control information (DCI) formats for single UL SF scheduling. Here, DCI format 0A is DCI for transmission of 1 transmission block (TB) and DCI format 4A is DCI for transmission of 2 TBs. DCI formats 0B/4B are DCI formats for multiple UL SF scheduling. Here, DCI format 0B is DCI for transmission of 1 TB and DCI format 4B is DCI for transmission of 2 TBs.

The maximum number of SFs that the DCI format 0B/4B can schedule may be set (to, for example, one of 1/2/3/4) by the base station.

Here, for the LAA SCell in which LAA UL is configured, DCI format 0A/4A may be configured by default and DCI format 0B/4B may be configured by additional RRC signaling.

Further, in the Rel-14 eLAA system to which the present invention is applicable, for DCI formats 0A/0B/4A/4B, adjustment of the number of (E)PDCCH blind detection (BD) candidates per cell (and/or per aggregation level and/or per DCI format) may be configured by RRC signaling. Specifically, for DCI formats 0B/4A/4B, a scaling factor may be set to one 0/0.5/1/1.5 for the 3rd/4th/5th aggregation level of (E)PDCCH by RRC signaling. In other cases, the scaling factor may be set to one of 0/0.33/0.66/1 by RRC signaling. In this case, the UE may perform the (E)PDCCH BDs corresponding to the product of the corresponding scaling factor and the number of (legacy (E)PDCCH) BD candidates.

Hereinafter, a method for adjusting BD candidates when a UE receives an UL grant in the LAA system to which the present invention is applicable will be described in detail.

BD adjustment may be defined as (optional) UE capability. In this case, information on the maximum number of configured CCs and/or the maximum number of BDs may be signaled as UE capability.

4.1.1. First BD Candidate Adjustment Method

If DCI format 0B/4B is configured for a UE that does not have BD adjustment-related UE capability or a UE that transmits signaling that the corresponding UE capability is not supported, the size thereof may be different from that of DCI format 0A/4A, and thus the number of (E)PDCCH BD candidates may increase.

In this case, the following rules may be configured to prevent the number of (E)PDCCH BDs of the UE from increasing.

As an example, if the number of (E)PDCCH BDs set before the DCI format 0B/4B is configured is M (e.g., M=32 for Transmission Mode (TM) 1 UE and M=48 for TM2 UE) for the cell, a rule may be configured such that the value of M is still maintained even when DCI format 0B/4B is configured.

For simplicity, options applicable when it is assumed that the number of BDs for DCI format 0A/4A is P will be described in detail below.

[Opt 1] Set the number of BDs for DCI format 0A/4A to 0

[Opt 2] Set the number of BDs for DCI format 0B/4B to 0

[Opt 3] Set the number of BDs for DCI format 0B/4B to M-K (e.g., K=M/2 or K=M*a, 0<a<1 or K=P*b, where 0<b<1), and the number of BDs for DCI format 0A/4A to K (e.g., K=M/2 or K=M*a, where 0<a<1 or K=P*b, where 0<b<1). Here, the value of K, a, or b may be predefined or configured through higher layer signaling or L1 signaling. Also, the value of a or b, which is a scaling factor for all aggregation levels (ALs), may be set in common for all ALs or differently for the ALs. As a specific example, in the case of the TM1 UE, the configured PDCCH BD candidates for the corresponding LAA Scell may include 16 BD candidates corresponding to the UE-specific DL TM (i.e., 6/6/2/2 candidates for AL 1/2/4/8), 16 BD candidates corresponding to the fall-back DL TM and DCI format 0A, and, if the DCI format 0B is configured, 16 BD candidates corresponding thereto.

In the case of [Opt 1], the number of BD candidates corresponding to the fall-back DL TM and DCI format 0A may be set to 0.

In the case of [Opt 2], the number of BD candidates corresponding to DCI format 0B may be set to 0.

In the case of [Opt 3], the number of BD candidates corresponding to the fall-back DL TM and DCI format 0A may be set to 8, and the number of BD candidates corresponding to DCI format 0B may be set to 8. In this case, 0.5 may be applied as a scaling factor for all AL of DCI format 0A/0B.

In addition, the same rules described above may be applied even for a UE that has no BD adjustment-related UE capability or a UE having transmitted signaling that the UE capability is supportable, if the UE does not receive the BD adjustment related RRC signaling.

The method may always be applied only when DCI format 0B/4B is set configured for a specific CC (LAA SCell) (Alt. 1), or the total number of BD candidates set on the configured CC is greater than the capability of the UE (the maximum number of supportable BD candidates) (Alt. 2).

In the case of Alt. 2, if the total number of BD candidates set on the configured CC is less than the capability of the UE (the maximum number of supportable BD candidates), the number of BDs may increase even if the DCI format 0B/4B is configured for the UE.

As an example, when the number of BDs set before the DCI format 0B/4B is configured is M (e.g., M=32 for TM1 UE and =48 for TM2 UE) for the corresponding cell and the increased number of BDs according to configuration of DCI format 0B/4B is N (e.g., N=16 for TM1 UE and N=32 for TM2 UE), the number of BDs for the corresponding CC may be set to M+N. If the total number of BD candidates set on the configured CC is greater than the capability of the UE (the maximum number of supportable BD candidates), the first BD candidate adjustment method described above may be applied to all configured cells, to all configured LAA SCells, or only to a specific LAA SCell among the configured LAA SCells. If the first BD candidate adjustment method is applied only to a specific LAA SCell among the configured LAA SCells, the first BD candidate adjustment method may be applied in predetermined order (e.g., in order of cell indexes) until the number becomes smaller than the total BD candidate number.

4.1.2. Second BD Candidate Adjustment Method

If multiple UE scheduling reception capability is configured for UE capability, the capability may be defined as a prerequisite UE feature of BD adjustment-related UE capability. In other words, a restriction may be imposed such that the UE capability for multiple UL SF scheduling reception capability is supported only for UEs for which the BD adjustment-related UE capability is supported. In other words, a restriction that BD adjustment-related UE capability should always be supportable by a UE supporting multiple UL SF scheduling reception capability.

4.2. Method for Signal Transmission in an Unlicensed Band and Configuration Therefor As described above, in the NR system to which the present invention is applicable, signals may be transmitted through beamforming using a plurality of antennas (particularly, in the mmWave band). For this purpose, the transmitting end may perform transmission toward only a part of the entire cell coverage per time unit using the analog beam, and may perform beam sweeping for the analog beam omni-directionally over several time units. Thereby, the entire cell coverage may be covered.

Therefore, in the present invention, an efficient transmission method of DL and UL signals (which may be transmitted/received through beamforming) in an unlicensed band in which operation is performed based on random access will be described in detail.

Here, examples of the DL and UL signals that may be transmitted by beam sweeping in the NR (or LTE) system may include a synchronization signal (SS), a broadcast channel (e.g., PBCH or paging or system information, an SS block (including SS and physical broadcast channel (PBCH)), and CSI-RS, RACH, PUCCH, PUSCH, and SRS, which may be utilized for CSI or RRM measurement or beam management. DL and UL signals applicable to the present invention are not limited to above-described signal/channel but may include various signals/channels.

4.2.1. Method for Signal Transmission in the Unlicensed Band

As described above, in the wireless communication system to which the present invention is applicable, a signal may be transmitted by beam sweeping for several time regions.

Figure 18:
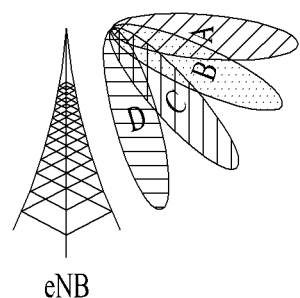
FIG. 18 is a diagram schematically illustrating a beam sweeping operation that may be employed in the present invention.
Figure 19:
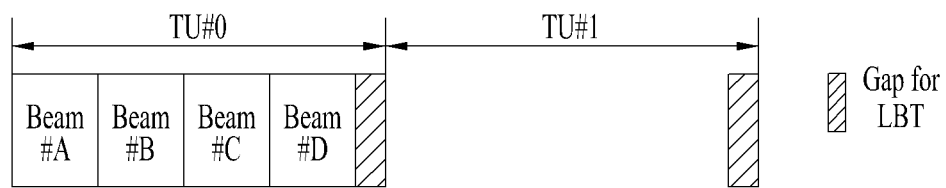
FIG. 19 is a diagram illustrating an exemplary case where each beam is transmitted according to beam sweeping.

FIG. 18 is a diagram schematically illustrating a beam sweeping operation that may be employed in the present invention, and FIG. 19 is a diagram illustrating an exemplary case where each beam is transmitted according to beam sweeping.

As shown in FIG. 18, when an eNB (or gNB) attempts to transmit a DL signal by performing sweeping on four analog beams, it may divide one TU into several time regions as shown in FIG. 19 to attempt DL transmission using each beam. A similar method may be used for UL transmission.

In FIG. 19, 1 TU may means 1 slot (or subframe), several slots, 1 symbol, or an interval of several symbols according to an embodiment.

When 1 TU means 1 slot, each beam may be transmitted over several symbols. In this case, the time regions allocated to the respective beams may have the same size or different sizes.

While beams constituting a TU are illustrated in FIG. 19 as being assigned different indexes for convenience of explanation, some of the beams transmitted in a specific TU may be configured to have the same index (e.g., beam #A/ABB or beam #A/B/A/B) or all beams may be configured to have the same index (e.g., beam #A/A/A/A).

In addition, only one beam direction transmission may be configured per TU, or multiple beam signals may be configured to be transmitted over several TUs including with a gap for LBT. In this case, whether to transmit each beam signal may be determined according to the result of the LBT immediately before the start of the TU.

Alternatively, the signal may be transmitted only in a specific beam direction that is determined to be idle according to the result of the LBT immediately before transmission. In this case, if beam sweeping-based transmission is periodically configured, the beam index actually transmitted may vary among the respective periods depending on the LBT result.

Also, from the DL perspective, considering LBT for TU #1 transmission of a neighboring cell, last few time regions for TU #0 transmission may be configured to be left empty. In contrast, from the UL perspective, considering LBT for TU #1 transmission of another UE, last few time regions for TU #0 transmission may be configured to be left empty. Alternatively, the signal may be configured to be transmitted until the last boundary of the TU without a gap region for LBT.

Considering that the signal is allowed to be transmitted in the U-band only when LBT is successful, even if all signals to be transmitted can be included in one TU, not all signals may be transmitted if LBT continues to fail for the TU.

To address this issue, the UE or the base station may configure multiple TUs in which a signal can be transmitted, and then transmit a signal through the corresponding TU is LBT is successful.

As an example, when two TUs are configured as shown in FIG. 19, even if LBT for TU #0 fails, the UE or the base station may be allowed to attempt LBT once more for TU #1 transmission. For simplicity, it is assumed in the following description that two TUs are regions in which signal transmission is allowed. However, the configuration may be applied even to a case where N (N>1) TUs are pre-allocated (or N TUs are periodically allocated).

Hereinafter, a beam sweeping-based signal transmission method according to failure of the base station or the UE in LBT will be described in detail.

4.2.1.1. First Signal Transmission Method in the Unlicensed Band

If the base station or the UE does not succeed in LBT until the start boundary of a specific TU, the base station or the UE may abandon all transmissions in the TU and perform LBT for the next TU transmission.

Figure 20:
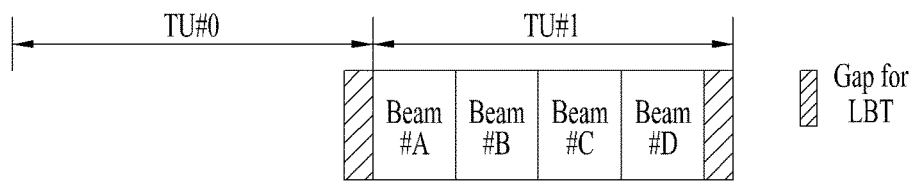
FIG. 20 is a diagram schematically illustrating a first signal transmission method in an unlicensed band according to the present invention.

FIG. 20 is a diagram schematically illustrating a first signal transmission method in an unlicensed band according to the present invention.

As shown in FIG. 20, if the base station or the UE does not succeed in LBT for TU #0 transmission until the TU #0 start boundary, the base station or the UE may abandon all transmissions in TU #0, and may attempt LBT for the next TU #1 transmission to perform signal transmission.

4.2.1.2. Second Signal Transmission Method in the Unlicensed Band

Compared to the first signal transmission method in the unlicensed band described above, it may be advantageous for the base station or the UE to attempt (or perform) beam transmission as can be performed in the TU even if the base station or the UE does not succeed in LBT at the start boundary of the TU.

Figure 21:
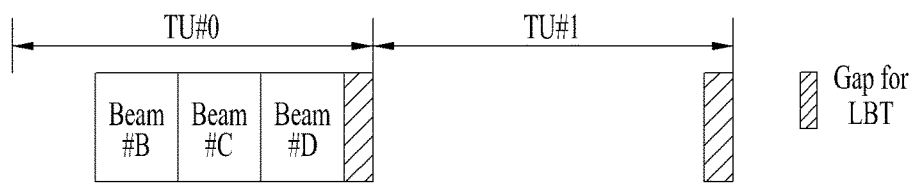
FIG. 21 is a diagram schematically illustrating a second signal transmission method in an unlicensed band according to the present invention.
Figure 21:
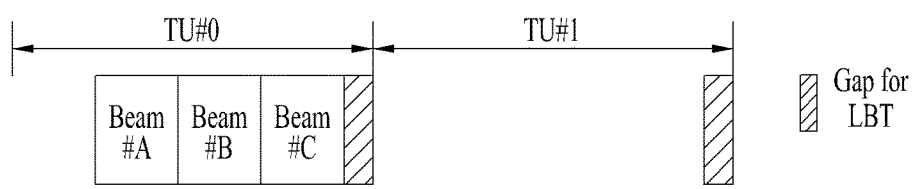

FIG. 21 is a diagram schematically illustrating a second signal transmission method in an unlicensed band according to the present invention.

As shown in FIG. 21, if the base station or the UE succeeds in LBT for and after the second beam-based signal to be transmitted in the TU, the base station or the UE may attempt to perform transmission since the corresponding time region in the TU period.

More specifically, the base station or the UE may attempt transmission while puncturing a beam transmission corresponding to a time region in which LBT fails as shown in FIG. 21(a), or may attempt transmission by shifting a beam to be transmitted at and after a TU start boundary.

4.2.1.3. Third Signal Transmission Method in the Unlicensed Band

When a base station or a UE transmits a signal as in the second signal transmission method in the unlicensed band, some beam signals to be transmitted in the TU may be lost.

In the third signal transmission method in the unlicensed band, a detailed description will be given of how a beam signal that the base station or the UE has failed to transmit due to failure in LBT is transmitted in the next TU.

Figure 22:
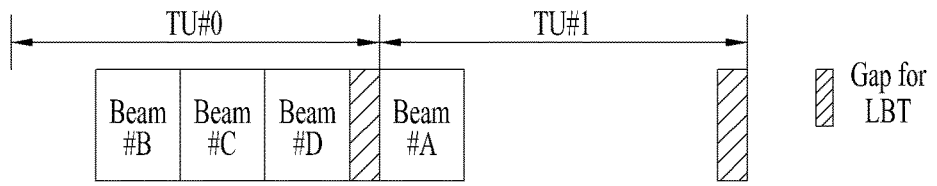
FIG. 22 is a diagram schematically illustrating a third signal transmission method in an unlicensed band according to the present invention.
Figure 22:
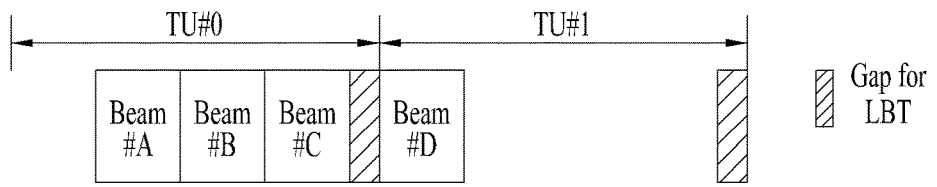
Figure 22:
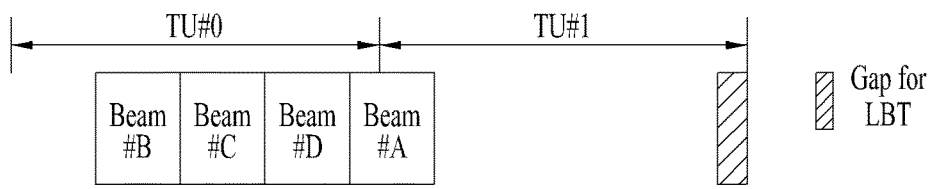
Figure 22:
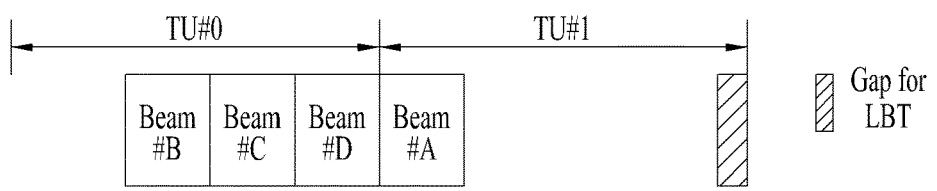

FIG. 22 is a diagram schematically illustrating a third signal transmission method in an unlicensed band according to the present invention.

If the base station or the UE succeeds in LBT during a gap for the LBT as shown in FIG. 22(a) or 22(b), the base station or the UE may transmit, in TU #1, a beam signal lost in the TU #0. On the other hand, if the base station or the UE fails in LBT during the gap for the LBT, the base station or the UE may transmit the beam signal lost in TU #0 after LBT in the next TU or the next time region of the TU (or may abandon the transmission).

Alternatively, the interval between TU #0 and TU #1 may be configured to transmit a signal for occupying a channel, without being emptied as a separate gap. Thus, the base station or the UE may perform signal transmission in between TU #0 and TU #1 without performing LBT.

Referring to FIG. 22(c) or 22(d), in order to minimize such signal transmission for the purpose of occupying a channel, the start time of the beam signal to be transmitted in TU #1 may be changed without a gap between TU #0 and TU #1 (FIG. 22(c)) or the start time of the beam signal to be transmitted in TU #0 may be changed (FIG. 22(d)).

Additionally, in the transmission method as illustrated in FIG. 22(c) or 22(d), the beams to be transmitted from the TU start boundary may be shifted and transmitted (i.e., in order of beams #A/B/C/D).

4.2.1.4. Fourth Signal Transmission Method in the Unlicensed Band

When a signal is actually transmitted through beam sweeping in the TU, the Tx and/or Rx beam may also be subjected to sweeping and thus may not be easily multiplexed with other signals. In this section, configuring signal transmission once subjected to sweeping the beam sweeping such that the signal transmission is performed until the last boundary of the TU will be described.

Figure 23:
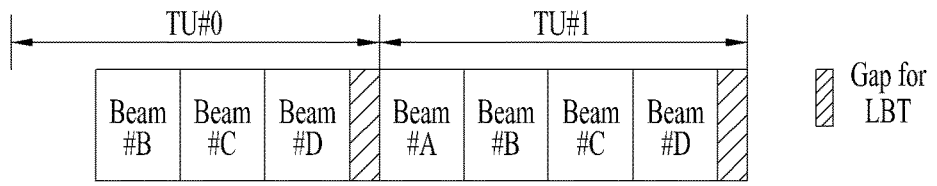
FIG. 23 is a diagram schematically illustrating a fourth signal transmission method in an unlicensed band according to the present invention.
Figure 23:
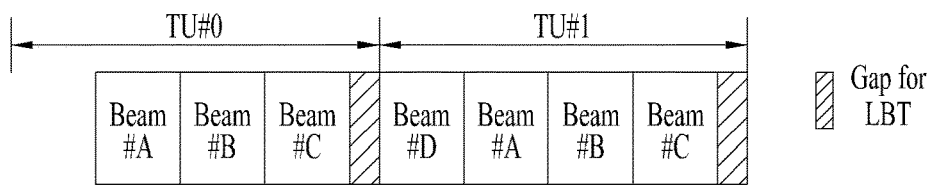
Figure 23:
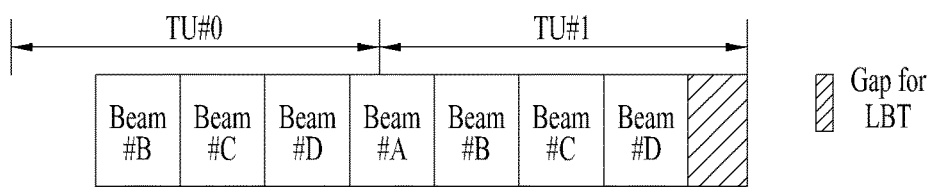
Figure 23:
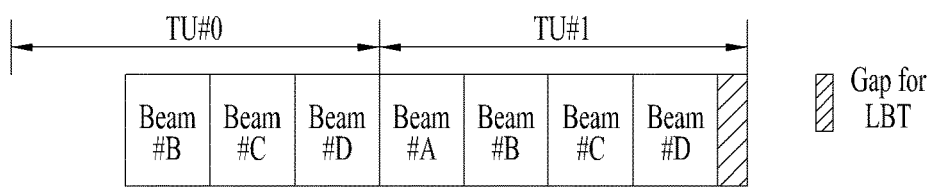

FIG. 23 is a diagram schematically illustrating a fourth signal transmission method in an unlicensed band according to the present invention.

As illustrated in FIG. 23(a) or 23(b), when a base station or a UE succeeds in LBT during the gap for the LBT, the base station or the UE may transmit all beam signals even in TU #1. However, if the base station or the UE fails in the LBT during the gap for the LBT, the base station or the UE may attempt to transmit a beam signal after performing the LBT in the next TU or the next time region of the TU (or may abandon the transmission).

Alternatively, the interval between TU #0 and TU #1 may be configured to transmit a signal for occupying a channel, without being emptied as a separate gap. Thus, the base station or the UE may perform signal transmission in between TU #0 and TU #1 without performing LBT.

Referring to FIG. 23(c) or 23(d), in order to minimize such signal transmission for the purpose of occupying a channel, the start time of the beam signal to be transmitted in TU #1 may be changed without a gap (FIG. 23(c)) or the start time of the beam signal to be transmitted in TU #0 may be changed (FIG. 23(d)).

Additionally, in the transmission method as illustrated in FIG. 23(c) or 23(d), the beams to be transmitted from the TU start boundary may be shifted and transmitted (i.e., in order of beams #A/B/C/D).

4.2.1.5. Fifth Signal Transmission Method in the Unlicensed Band

In the NR system to which the present invention is applicable, the maximum number of transmissions (L) of SS blocks may be configured for a certain time period (e.g., 5 ms) according to the frequency band. For example, L may be set to 4 (L=4) for NR systems at or below 3 GHz, to 8 (L=8) for NR systems at or below 6 GHz, and to 64 (L=64) for NR systems above 6 GHz.

In this case, the base station may have a degree of freedom to transmit only SS blocks whose number is less than L. In transmitting only SS blocks whose number is less than L (considering DL/UL scheduling flexibility), the base station does not need to transmit only consecutive SS block indexes.

Accordingly, a separate method for the base station to informing the UE of SS block indexes to be actually transmitted is needed. For example, the base station may deliver the corresponding information to the UE through cell-specific RRC (e.g., remaining system information (RMSI)) and/or UE-specific RRC signaling.

Hereinafter, a specific SS block transmission method used when a base station transmits SS blocks whose number S is less than L (i.e., S<L) will be described in detail.

[Opt. 1] If some SS blocks are not transmitted due to LBT, the base station shall assume S (or an integer multiple of S) SS block transmissions and transmit SS blocks that have failed to be transmitted after the S-th (or "integer multiple of S"-th) SS block. Here, the value of S may be signaled through PBCH DM-RS or PBCH contents.

[Opt. 2] If some SS blocks are not transmitted due to LBT, the base station shall always assume L (or an integer multiple of L) SS block transmissions regardless of the value of S, leave the time period from the "S+1"-th (or "integer multiple of S+1"-th) SS block to the L-th (or "integer multiple of L"-th) SS block empty or use the time period for other base station implementation, and transmit the SS blocks that have failed to be transmitted, after the L-th (or "integer multiple of L"-th) SS block time resource.

[Opt. 3] When the default periodicity of the SS block transmission assumed in the initial access is T1 ms (e.g., T1=20), the base station shall transmit some SS block(s) that have failed to be transmitted due to failure of LBT every T2 (T2<T1).

Figure 24:
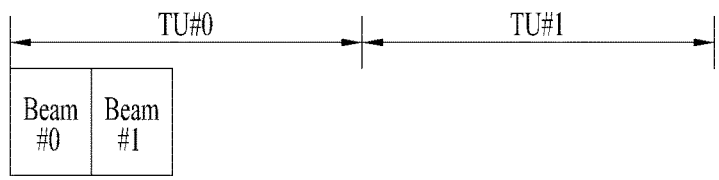
FIG. 24 is a diagram schematically illustrating a fifth signal transmission method in an unlicensed band according to the present invention.
Figure 24:
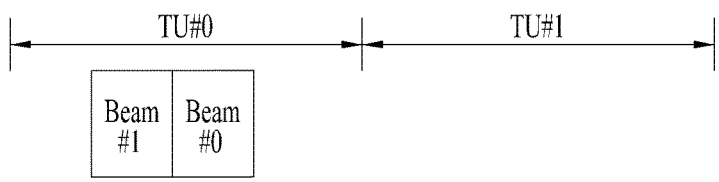
Figure 24:
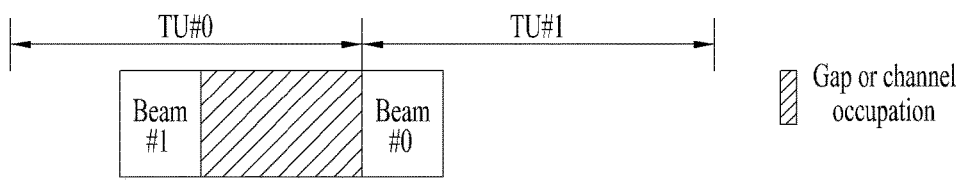
Figure 24:
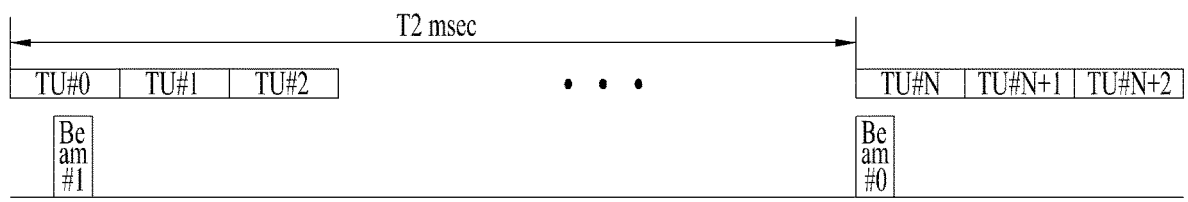

FIG. 24 is a diagram schematically illustrating a fifth signal transmission method in an unlicensed band according to the present invention.

In FIG. 24, it is assumed that L=4 and S=2. FIG. 24(a) illustrates a case where the base station transmits two SS blocks from the start time as it succeeds in LBT. FIG. 24(b) schematically illustrates an exemplary operation according to [Opt. 1], FIG. 24(c) schematically illustrates an exemplary operation according to [Opt. 2], and FIG. 24(d) schematically illustrates an exemplary operation according to [Opt. 3].

In the case of [Opt. 1], depending on the number S, the position of a re-attempted SS block according to failure in LBT may be changed. In the case of [Opt. 2], however, the relative position between the position of a re-attempted SS block and the TU boundary may be fixed regardless of the value of S, which is an advantage. On the other hand, in [Opt. 2], if there is no DL data to be transmitted when LBT fails, the base station should occupy the channel using a dummy signal, or the base station should leave the channel empty and perform LBT again, which is a disadvantage.

4.2.2. Solutions to Signal Transmission Ambiguity

When the actual transmission start time is changed according to the result of LBT result as in the signal transmission methods described above, it may not be easy to receive signals from the perspective of a UE receiving a DL signal subjected to beam sweeping or an eNB receiving a UL signal. Alternatively, when a signal is allowed to be transmitted only in a specific beam direction determined to be idle according to the result of LBT immediately before transmission, if the corresponding beam sweeping based transmission is periodically configured, the beam index actually transmitted may be varied among the respective periods according to the LBT result.

In this case, the reception node may attempt blind detection for all candidates to ensure successful reception. In order to provide more stable reception performance, a method for lowering ambiguity of a transmission start point or the actually transmitted beam index needs to be additionally considered.

In this section, a method for lowering ambiguity of an actually transmitted beam index will be described in detail.

4.2.2.1. First Solution to Signal Transmission Ambiguity

The transmission signal for each beam may include information about the symbol and/or slot index on which the corresponding beam signal is transmitted. Alternatively, a series of beam bursts successively composed of several beams and transmitted may include information about the start (and/or last) symbol and/or slot or beam index of the burst.

The transmission methods for the information that may be employed may include 1) performing the transmission by configuring a sequence of a beam signal differently according to the information, 2) performing the transmission by configuring time/frequency/code domain resources of a beam signal differently according to the information, 3) transmitting broadcast information in a beam signal, and 4) performing the transmission on another carrier (or a licensed carrier).

As an example, if the TU index in which a beam signal is transmitted varies according to the LBT result as in the first signal transmission method in the unlicensed band, the corresponding TU index information may be transmitted in a transmission signal for each beam.

As another example, if the transmission is allowed within the TU according to the LBT result as in FIGS. 22 to 24, the start time region index or the start beam index of the beam burst may be transmitted in a transmission signal for each beam.

4.2.2.2. Second Solution to Signal Transmission Ambiguity

If the information to be included in the corresponding beam burst varies according to the LBT result as in the first solution to signal transmission ambiguity described above, the complexity of the transmission node may increase.

To address this issue, the signal subjected to beam sweeping may be periodically transmitted, or when a next beam burst transmission is additionally configured, information about the previous beam burst transmission may be transmitted.

Similarly, the transmission methods for the information that may be employed may include 1) performing the transmission by configuring a sequence of a beam signal differently according to the information, 2) performing the transmission by configuring time/frequency/code domain resources of a beam signal differently according to the information, 3) transmitting broadcast information in a beam signal, and 4) performing the transmission on another carrier (or a licensed carrier).

Figure 25:
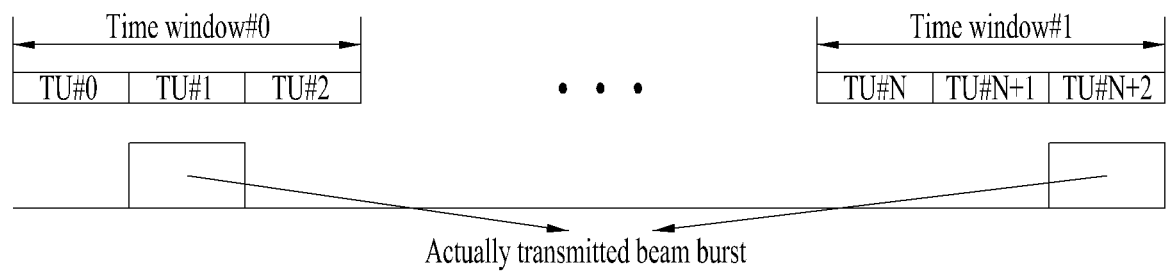
FIG. 25 is a diagram schematically illustrating a method for addressing second signal transmission ambiguity according to the present invention.

FIG. 25 is a diagram schematically illustrating a method for addressing second signal transmission ambiguity according to the present invention.

As shown in FIG. 25, when a time window consisting of three TUs may be periodically configured. When a beam burst is actually transmitted in TU #N+2 in time window #1, the beam burst may include information about the TU index of the beam burst transmitted in time window #0, and/or the start symbol, and/or slot or beam index of the of the burst.

Specifically, for a specific beam signal transmitted in time window #1, the value of time offset from the same beam signal transmitted in time window #0 may be signaled.

In addition, information indicating that transmission has not been performed in time window #0 due to failure in LBT may be transmitted. Furthermore, in time window #X, information about beam burst transmission in the past K time windows may be transmitted.

4.2.2.3. Third Solution to Signal Transmission Ambiguity

When the same beam signal can be repeatedly transmitted several times in one beam burst as illustrated in FIG. 23, it may be advantageous in receiving the signals that information indicating the sequential position of the currently transmitted beam signal is transmitted.

In this case, the transmission methods for the information that may be employed may include 1) performing the transmission by configuring a sequence of a beam signal differently according to the information, 2) performing the transmission by configuring time/frequency/code domain resources of a beam signal differently according to the information, 3) transmitting broadcast information in a beam signal, and 4) performing the transmission on another carrier (or a licensed carrier).

As an example, in the case of beam #C transmitted in TU #0 in FIG. 23(c), an indication that beam #C is the first transmission of the beam #C-based signals to be transmitted twice within the corresponding beam burst may be signaled. Upon receiving the information, the UE may infer the start and end boundaries of the next beam #C-based signal.

As another example, in the case of beam #D transmitted in TU #1 in FIG. 23(d), an indication that beam #D is the second transmission of beam #D-based signals to be transmitted twice within the corresponding beam burst may be signaled. Upon receiving the information, the UE may infer the start and end boundaries of the previous beam #C-based signal buffered in TU #0.

The methods above may be used even when the same beam is repeatedly transmitted as in the case of beams #A/B/A/B instead of beams #A/B/C/D to constitute one TU.

The above-described first to third solutions to signal transmission ambiguity may be useful for the UE to identify the boundaries and indexes of radio frames, and/or subframes, and/or slots, and/or symbols, particularly in the initial access step.

As an example, in the first solution to signal transmission ambiguity, a UE receiving information about the (start) slot index and/or symbol index at which a beam signal (e.g., a primary synchronization signal (PSS), a secondary synchronization signal (SSS), a PBCH, an RMSI, or the like) is transmitted may identify the boundaries and indexes of the radio frame, and/or subframe, and/or slot, and/or symbol of an unlicensed carrier when accessing the carrier.

As another example, a UE receiving the information about the slot indexes and/or symbol indexes at which beam signals (e.g., PSS, SSS, PBCH, RMSI, etc.) have been transmitted in the past K time windows as in the second solution to signal transmission ambiguity may receive the same beam signals transmitted in the past time windows by combining the signals, thereby increasing the reception accuracy.

In the first to third solutions to signal transmission ambiguity described above, the (starting) TU index (e.g., slot/symbol index) may be announced using various methods.

As an example, the (starting) TU index (e.g., slot/symbol index) may be transmitted to the UE over an initial signal, which is transmitted prior to a beam signal (e.g., PSS, SSS, PBCH, RMSI (which represents remaining system information as broadcast system information similar to SIB of the LTE system), etc.).

As another example, a DM-RS sequence transmitted on the PBCH may be generated as a function of a (starting and/or last) TU index (e.g., slot/symbol index) of a corresponding SS block (or the first transmitted SS block of the SS block burst including the SS block) to signal the TU index (e.g., slot/symbol index) to the UE.

As another example, the (starting and/or last) TU index (e.g., slot/symbol index) information about a corresponding SS block (or the first transmitted SS block of the SS block burst including the SS block) may be included in PBCH contents to be transmitted to the UE (and/or PBCH scrambling sequence generation may be configured as a function of the TU index, and related information may be delivered to the UE).

As another example, the (starting and/or last) TU index (e.g., slot/symbol index) information about a corresponding SS block (or the first transmitted SS block of the SS block burst including the SS block) may be included in the RMSI to be transmitted to the UE.

Here, if TDM is performed on the SS block and the RMSI, the (starting and/or last) TU index (e.g., slot/symbol index) information about the SS block linked to the RMSI (or the first transmitted SS block of the SS block burst including the SS block) and/or information about a TU index (e.g., slot/symbol index) at which the RMSI is transmitted may be included in the RMSI to be transmitted.

4.2.3. Channel Access Procedure (e.g., LBT)

In this section, the channel access procedure or LBT method for DL/UL signals transmitted through beam sweeping as described above will be described in detail.

In the LTE LAA system to which the present invention is applicable, an LBT method operated based on a random backoff (hereinafter referred to as category 1 LBT for simplicity) is defined as a channel access procedure performed in DL transmission including (E)PDCCH/PDSCH and a type 1 UL channel access procedure. Also, in the LTE LAA system, as a channel access procedure performed in DL transmission which does not include (E)PDCCH/PDSCH and a type 2 UL channel access procedure, an LBT method in which transmission is allowed upon determining that the channel is idle only for a certain period of time (e.g., 25 usec) (hereinafter referred to as category 2 LBT for simplicity) is defined.

4.2.3.1. First Channel Access Procedure

For a DL/UL signal to be transmitted through beam sweeping, when the base station or the UE succeeds in performing the category 1 LBT in the wide-beam or omni-directional beam direction (or when the backoff counter value becomes 0), the base station or the UE may be allowed to transmit signals by beam sweeping in all beam directions.

4.2.3.2. Second Channel Access Procedure

For a DL/UL signal to be transmitted through beam sweeping, when the base station or the UE succeeds in performing the category 1 LBT in the wide-beam or omni-directional beam direction (or when the backoff counter value becomes (e.g., X=0 or X=1)), the base station or UE may be allowed to sequentially perform the category 2 LBT in directions of (narrow) beams to be transmitted thereafter (or until the category 1 LBT succeeds) and to perform transmission through beam sweeping only in the beam direction(s) in which the category 2 LBT is successful.

Alternatively, only when the base station or the UE succeeds in category 2 LBT (or category 1 LBT) in the wide-beam or omni-directional beam direction again (if there is a successful beam) after sequentially performing the category 2 LBT in the directions of (narrow) beams to be transmitted, the base station or the UE may perform transmission through beam sweeping in the beam direction(s) in which the category 2 LBT performed in the (narrow) beam directions is successful.

As an example, as shown in FIG. 18, if a base station to transmit a DL signal by sweeping with four (narrow) beams succeeds in performing the category 1 LBT in a wide-beam or omni-directional beam direction, the base station may perform the category 2 LBT in order of beams A, B, C and D. If the LBT is successful only for beams A/D, the base station may perform beam sweeping with beams A/D alone to (consecutively) transmit the corresponding signals.

As another example, as shown in FIG. 18, if a base station to transmit a DL signal by sweeping with four (narrow) beams succeeds in performing the category 1 LBT in a wide-beam or omni-directional beam direction, the base station may perform the category 2 LBT in order of beams A, B, C and D. If the LBT is successful only for beams A/D, the base station performs the category 2 LBT again in the wide-beam or omni-directional beam direction. Subsequently, if the LBT is successful, the base station may perform beam sweeping with beams A/D alone to (consecutively) perform transmissions.

When the channel access procedure (or LBT) as described above is applied to the UE, the base station may configure a method of the channel access procedure described above to be applied for the UE through RRC signaling.

Figure 26:
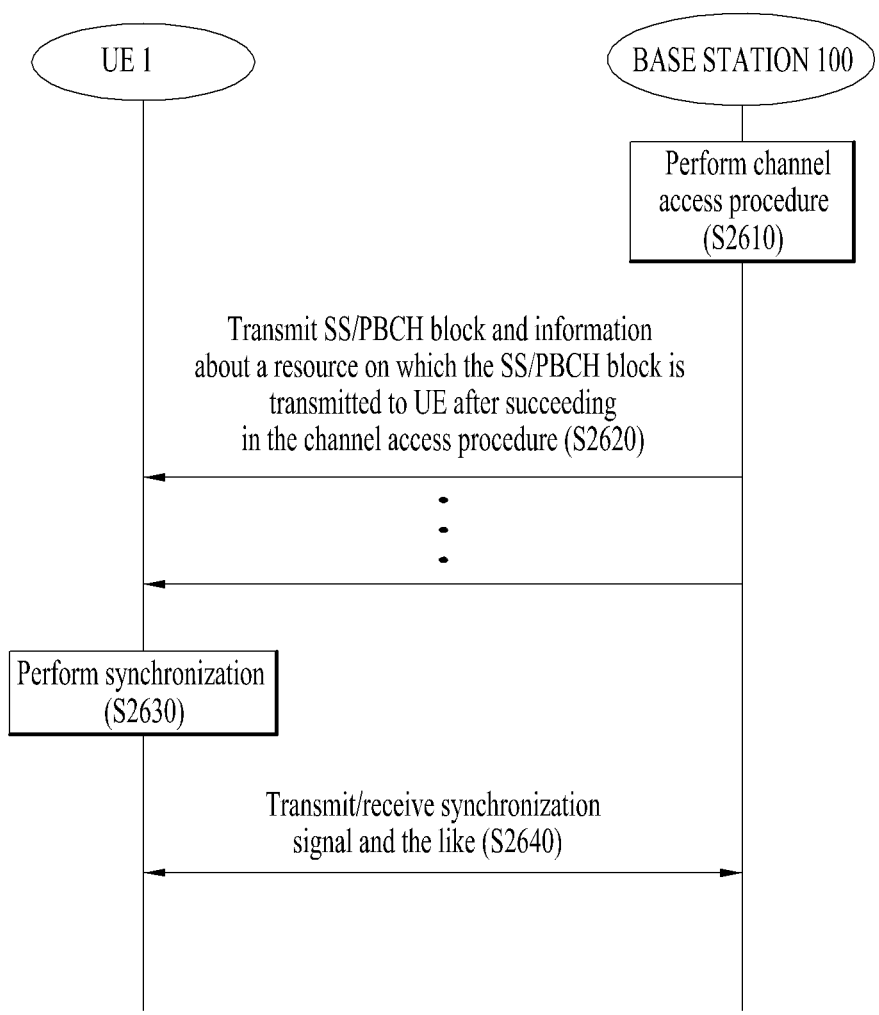
FIG. 26 is a diagram illustrating a method for transmitting and receiving signals between a base station and a terminal in an unlicensed band according to the present invention.

FIG. 26 is a diagram illustrating a method for transmitting and receiving signals between a base station and a UE in an unlicensed band according to the present invention.

First, a base station 100 performs a channel access procedure for signal transmission via an unlicensed band (S2610). Herein, the channel access procedure may refer to the LBT described above. In this case, one of the category 1 LBT or category 2 LBT described above may be applied as the channel access procedure.

Then, after the channel access procedure is successfully performed, the base station 100 transmits, to a UE 1, a synchronization signal (SS)/physical broadcast channel (PBCH) block and information about a resource on which the SS/PBCH block is transmitted, via the unlicensed band (S2620). In this case, transmission of the SS/PBCH block and the information about the resource on which the SS/PBCH block is transmitted may be performed multiple times.

As an example, transmission of the SS/PBCH block and the information about the resource on which the SS/PBCH block is transmitted is performed multiple times, each SS/PBCH block may be transmitted in a different beam direction, and the resource information on which the SS/PBCH block is transmitted may include information on the different beams.

In addition, the information about the resource on which each SS/PBCH block is transmitted may further include a slot index at which the SS/PBCH block is transmitted and a symbol index at which the SS/PBCH block is transmitted.

Such information may be indicated through the sequence information applied to the corresponding SS/PBCH block, or may be indicated through broadcast information in the corresponding SS/PBCH block.

In the present invention, the SS/PBCH block may include a primary synchronization signal (PSS), a secondary synchronization signal (SSS), and a physical broadcast channel (PBCH).

Next, a method for signal transmission/reception between a UE and a base station through an unlicensed band will be described from the perspective of UE 1.

As described above, the UE 1 receives one or more synchronization signals (SS)/physical broadcast channels (PBCH) blocks and information about a resource on which each SS/PBCH block is transmitted (S2620).

Then, the UE 1 may combine and decode SS/PBCH blocks transmitted over the same beam among the one or more SS/PBCH blocks. In this case, the SS 1 combines and decodes the SS/PBCH blocks transmitted over the same beam using the resource information on which each SS/PBCH block is transmitted, thereby improving the reception performance for the SS/PBCH blocks.

Then, the UE 1 performs synchronization based on the decoded SS/PBCH block (S2630). For example, the UE 1 may determine a radio frame boundary of the unlicensed band and a slot boundary of the unlicensed band based on the information about the resource on which the SS/PBCH blocks transmitted over the same beam are transmitted.

Then, the UE 1 transmits a signal corresponding to the SS/PBCH blocks transmitted over the same beam, based on the determined radio frame boundary of the unlicensed band and the slot boundary of the unlicensed band (S2640). Further, the UE 1 may transmit/receive additional signals to/from the base station based on the determined radio frame boundary of the unlicensed band and slot boundary of the unlicensed band.

Since examples of the above-described proposal method may also be included in one of implementation methods of the present invention, it is obvious that the examples are regarded as a sort of proposed methods. Although the above-proposed methods may be independently implemented, the proposed methods may be implemented in a combined (aggregated) form of a part of the proposed methods. A rule may be defined such that the base station informs the UE of information as to whether the proposed methods are applied (or information about rules of the proposed methods) through a predefined signal (e.g., a physical layer signal or a higher-layer signal).

5. Device Configuration

Figure 27:
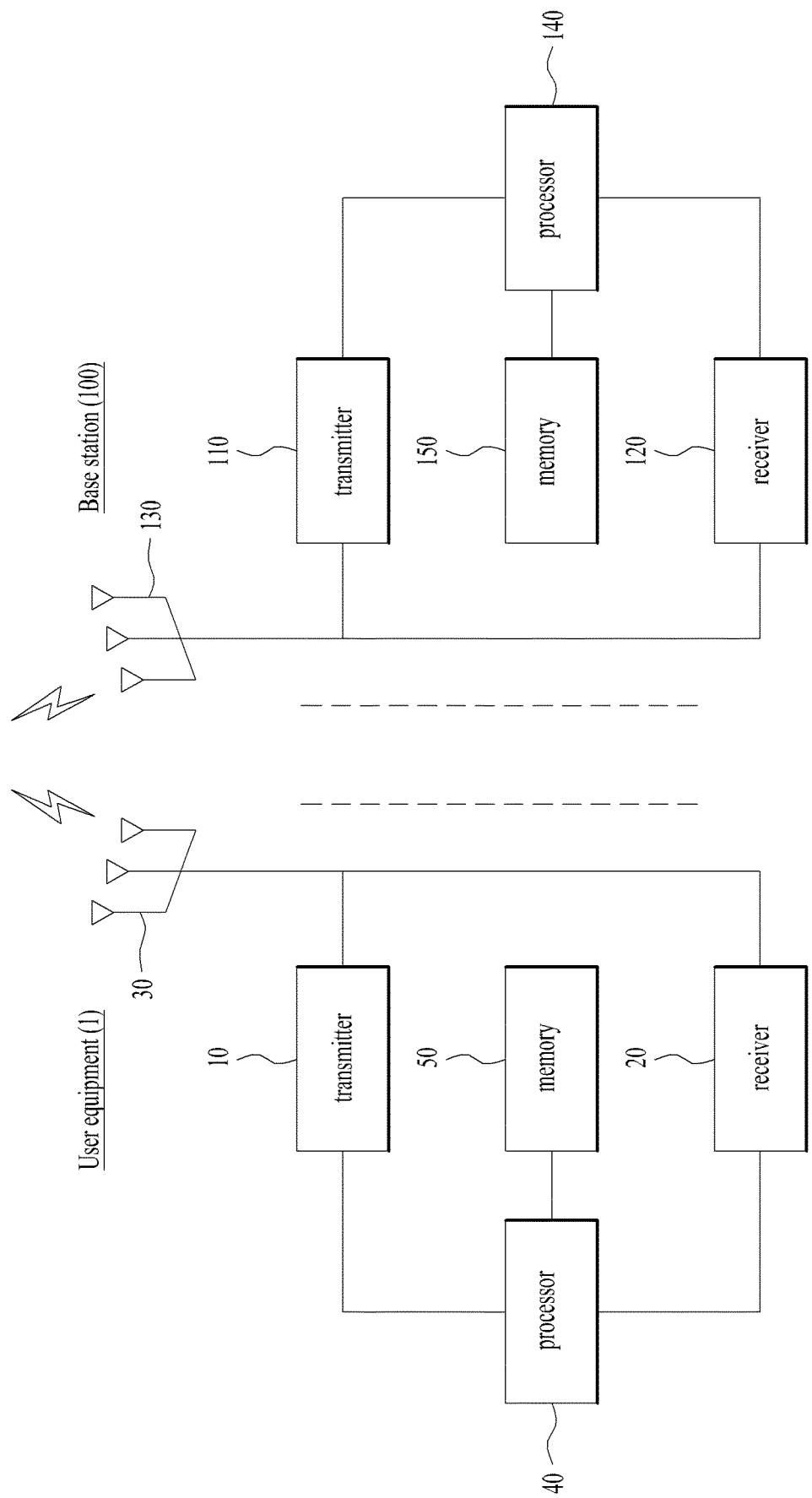
FIG. 27 is a diagram illustrating a configuration of a terminal and a base station in which the proposed embodiments can be implemented.

FIG. 27 is a diagram illustrating configurations of a UE and a base station capable of being implemented by the embodiments proposed in the present invention. The UE and the base station shown in FIG. 27 operate to implement the embodiments of the method for transmitting and receiving signals.

A UE 1 may act as a transmission end on a UL and as a reception end on a DL. A base station (eNB or new generation NodeB (gNB)) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The base station 100 configured as described above performs a channel access procedure for signal transmission in the unlicensed band through the transmitter 110 and/or the receiver 120. After the channel access procedure is successfully performed, the base station transmits, to the UE 1 through the transmitter 110, a synchronization signal (SS)/ physical broadcast channel (PBCH) block and information about a resource on which the SS/PBCH block is transmitted, through the unlicensed band.

In response, the UE 1 receives, from the base station 100, one or more SS/PBCH blocks and resource information through which the SS/PBCH blocks are transmitted through the unlicensed band via the receiver 20. Then, the UE 1 combines and decodes SS/PBCH blocks transmitted over the same beam among the one or more SS/PBCH blocks through the processor 40, and determines a radio frame boundary of the unlicensed band and a slot boundary of the unlicensed band based on the information about the resource on which the SS/PBCH blocks transmitted over the same beam are transmitted. Then, the UE 1 transmits, through the transmitter 10, a signal corresponding to the SS/PBCH blocks transmitted over the same beam, based on the determined radio frame boundary and the slot boundary of the unlicensed band.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 27 may further include a low-power Radio Frequency (RF)/ Intermediate Frequency (IF) module.

The UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a handheld PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method for receiving synchronization signals by a user equipment (UE) in a wireless communication system supporting an unlicensed band, the method comprising:
   obtaining information regarding a number of synchronization signal/physical broadcast channel (SS/PBCH) blocks transmitted in a preconfigured transmission time duration, wherein the number of the SS/PBCH blocks transmitted in the preconfigured transmission time duration is N; and
   receiving a SS/PBCH block via the unlicensed band in the preconfigured transmission time duration,
   wherein an index of the SS/PBCH block is determined based on the value of N, and
   wherein the value of N is smaller than a maximum transmission number of the SS/PBCH blocks determined based on a frequency band.

2. The method of claim 1, wherein,
   (i) based on the SS/PBCH block transmitted in a frequency band below 3 GHz, the maximum transmission number of the SS/PBCH blocks is configured as 4, (ii) based on the SS/PBCH block transmitted in a frequency band above 3 GHz and below 6 GHz, the maximum transmission number of the SS/PBCH blocks is configured as 8, and (iii) based on the SS/PBCH block transmitted in a frequency band above 6 GHz, the maximum transmission number of the SS/PBCH blocks is configured as 64.

3. The method of claim 1,
wherein the SS/PBCH block is received in one of a plurality of SS/PBCH block transmission positions within the preconfigured transmission time duration,
wherein the one of the plurality of SS/PBCH block transmission positions within the preconfigured transmission time duration is greater than or equal to the value of N, and
wherein the index of the SS/PBCH block is less than the value of N.

4. The method of claim 1, further comprising:
obtaining the information regarding the number of the SS/PBCH blocks transmitted in the preconfigured transmission time duration based on at least one of:
(i) PBCH information included in the SS/PBCH block, or
(ii) demodulation reference signal (DM-RS) information for the PBCH included in the SS/PBCH block.

5. A method for transmitting synchronization signals by a base station (BS) in a wireless communication system supporting an unlicensed band, the method comprising:
transmitting, to a user equipment (UE), information regarding a number of synchronization signal/physical broadcast channel (SS/PBCH) blocks transmitted in a preconfigured transmission time duration, wherein the number of the SS/PBCH blocks transmitted in the preconfigured transmission time duration is N;
performing a channel access procedure (CAP) for transmitting a SS/PBCH block via the unlicensed band; and
transmitting, to the UE, the SS/PBCH block via the unlicensed band in the preconfigured transmission time duration, based on a result of the CAP,
wherein an index of the SS/PBCH block is determined based on the value of N, and
wherein the value of N is smaller than a maximum transmission number of the SS/PBCH blocks determined based on a frequency band.

6. The method of claim 5,
wherein the SS/PBCH block is received in one of a plurality of SS/PBCH block transmission positions within the preconfigured transmission time duration,
wherein the one of the plurality of SS/PBCH block transmission positions within the preconfigured transmission time duration is greater than or equal to the value of N, and
wherein the index of the SS/PBCH block is less than the value of N.

7. A base station (BS) for transmitting synchronization signals in a wireless communication system supporting an unlicensed band, the base station comprising:
at least one radio frequency (RF) module;
at least one processor; and
at least one memory operably connectable to the at least one processor and storing instructions that, when executed, cause the at least one processor perform operations comprising:
transmitting, to a user equipment (UE), information regarding a number of synchronization signal/physical broadcast channel (SS/PBCH) blocks transmitted in a preconfigured transmission time duration, wherein the number of the SS/PBCH blocks transmitted in the preconfigured transmission time duration is N;
performing a channel access procedure (CAP) for transmitting a SS/PBCH block via the unlicensed band; and
transmitting, to the UE, the SS/PBCH block via the unlicensed band in the preconfigured transmission time duration, based on a result of the CAP,
wherein an index of the SS/PBCH block is determined based on the value of N, and
wherein the value of N is smaller than a maximum transmission number of the SS/PBCH blocks determined based on a frequency band.

* * * * *